United States Patent
Kim et al.

(10) Patent No.: US 9,100,646 B2
(45) Date of Patent: Aug. 4, 2015

(54) DEVICE AND METHOD FOR IMAGE ENCODING/DECODING USING PREDICTION DIRECTION CONVERSION AND SELECTIVE ENCODING

(75) Inventors: Hayoon Kim, Gyeonggi-do (KR); Joohee Moon, Seoul (KR); Yunglyul Lee, Seoul (KR); Haekwang Kim, Seoul (KR); Byeungwoo Jeon, Gyeonggi-do (KR); Mincheol Park, Gyeonggi-do (KR)

(73) Assignee: SK TELECOM CO., LTD., Seoul (KR)

( * ) Notice: Subject to any disclaimer, the term of this patent is extended or adjusted under 35 U.S.C. 154(b) by 1140 days.

(21) Appl. No.: 13/002,259

(22) PCT Filed: Aug. 31, 2009

(86) PCT No.: PCT/KR2009/004865
§ 371 (c)(1),
(2), (4) Date: Mar. 18, 2011

(87) PCT Pub. No.: WO2010/027170
PCT Pub. Date: Mar. 11, 2010

(65) Prior Publication Data
US 2011/0158315 A1     Jun. 30, 2011

(30) Foreign Application Priority Data

Sep. 3, 2008  (KR) ................ 10-2008-0086733
Sep. 5, 2008  (KR) ................ 10-2008-0087651

(51) Int. Cl.
*H04B 1/66* (2006.01)
*H04N 7/12* (2006.01)
(Continued)

(52) U.S. Cl.
CPC ........... *H04N 19/105* (2014.11); *H04N 19/119* (2014.11); *H04N 19/593* (2014.11); *H04N 19/61* (2014.11)

(58) Field of Classification Search
CPC . H04N 7/50; H04N 7/26244; H04N 7/26085; H04N 7/26079; H04N 7/26271
USPC .................................................. 375/240.03
See application file for complete search history.

(56) References Cited

U.S. PATENT DOCUMENTS

2005/0053299 A1*  3/2005  Fuchs et al. ............... 382/239
2005/0276493 A1   12/2005  Xin et al.
2006/0203907 A1    9/2006  Yang et al.
2008/0175317 A1*  7/2008  Han et al. ............... 375/240.12

FOREIGN PATENT DOCUMENTS

JP           09128533 A    5/1997

OTHER PUBLICATIONS

Korean Office Action dated Jul. 25, 2014.
(Continued)

*Primary Examiner* — Mehrdad Dastouri
*Assistant Examiner* — Kristin Dobbs
(74) *Attorney, Agent, or Firm* — Lowe Hauptman & Ham, LLP

(57) ABSTRACT

The present disclosure relates to an apparatus and method for encoding/decoding videos using prediction direction change and selective encoding. The present disclosure provides a video encoding apparatus that encodes the current block of a video, comprising a rectangle encoder for dividing and then successively encoding the current block at input into rectangular block units to output a rectangularly encoded bitstream; a square encoder for encoding the current block at input in square block units to output a squarely encoded bitstream; and an encoding selector for calculating the encoding costs of the rectangularly encoded bitstream and the squarely encoded bitstream so as to output the bitstream with a minimum encoding cost. According to the present disclosure, the prediction accuracy may be increased when encoding or decoding videos so that video encoding efficiency can be improved.

36 Claims, 30 Drawing Sheets

(51) Int. Cl.
*H04N 11/02* (2006.01)
*H04N 11/04* (2006.01)
*H04N 19/105* (2014.01)
*H04N 19/119* (2014.01)
*H04N 19/61* (2014.01)
*H04N 19/593* (2014.01)

(56) References Cited

OTHER PUBLICATIONS

International Search Report mailed Apr. 8, 2010 for PCT/KR2009/004865.

\* cited by examiner

4×4 BLOCK MODE

| $DC(0)$ | $AC_1(0)$ | $AC_2(0)$ | $AC_3(0)$ |
|---|---|---|---|
| $DC(1)$ | $AC_1(1)$ | $AC_2(1)$ | $AC_3(1)$ |
| $DC(2)$ | $AC_1(2)$ | $AC_2(2)$ | $AC_3(2)$ |
| $DC(3)$ | $AC_1(3)$ | $AC_2(3)$ | $AC_3(3)$ |

8×8 BLOCK MODE

| $DC(0)$ | $AC_1(0)$ | $AC_2(0)$ | $AC_3(0)$ | $AC_4(0)$ | $AC_5(0)$ | $AC_6(0)$ | $AC_7(0)$ |
|---|---|---|---|---|---|---|---|
| $DC(1)$ | $AC_1(1)$ | $AC_2(1)$ | $AC_3(1)$ | $AC_4(1)$ | $AC_5(1)$ | $AC_6(1)$ | $AC_7(1)$ |
| $DC(2)$ | $AC_1(2)$ | $AC_2(2)$ | $AC_3(2)$ | $AC_4(2)$ | $AC_5(2)$ | $AC_6(2)$ | $AC_7(2)$ |
| $DC(3)$ | $AC_1(3)$ | $AC_2(3)$ | $AC_3(3)$ | $AC_4(3)$ | $AC_5(3)$ | $AC_6(3)$ | $AC_7(3)$ |
| $DC(4)$ | $AC_1(4)$ | $AC_2(4)$ | $AC_3(4)$ | $AC_4(4)$ | $AC_5(4)$ | $AC_6(4)$ | $AC_7(4)$ |
| $DC(5)$ | $AC_1(5)$ | $AC_2(5)$ | $AC_3(5)$ | $AC_4(5)$ | $AC_5(5)$ | $AC_6(5)$ | $AC_7(5)$ |
| $DC(6)$ | $AC_1(6)$ | $AC_2(6)$ | $AC_3(6)$ | $AC_4(6)$ | $AC_5(6)$ | $AC_6(6)$ | $AC_7(6)$ |
| $DC(7)$ | $AC_1(7)$ | $AC_2(7)$ | $AC_3(7)$ | $AC_4(7)$ | $AC_5(7)$ | $AC_6(7)$ | $AC_7(7)$ |

*FIG.12*

IF ALL OF QUANTIZED FREQUENCY
COEFFICIENTS OF RECTANGULAR PREVIOUS
BLOCK (a, b, c, d) ARE '0'

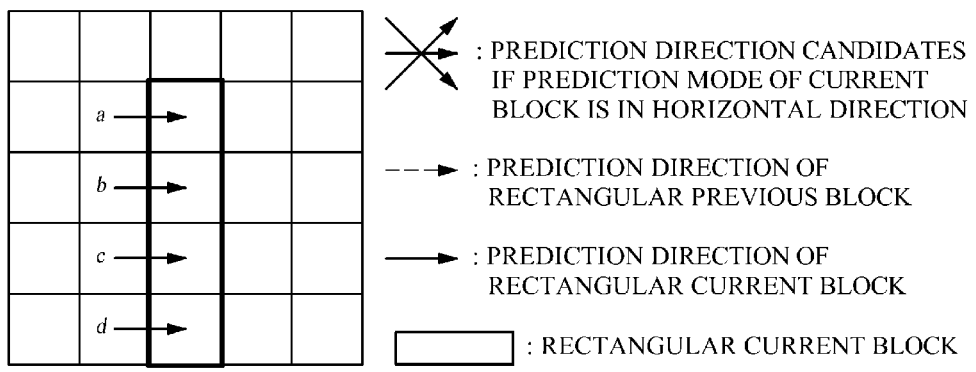

: PREDICTION DIRECTION CANDIDATES
IF PREDICTION MODE OF CURRENT
BLOCK IS IN HORIZONTAL DIRECTION

--→ : PREDICTION DIRECTION OF
RECTANGULAR PREVIOUS BLOCK

→ : PREDICTION DIRECTION OF
RECTANGULAR CURRENT BLOCK

☐ : RECTANGULAR CURRENT BLOCK

IF ONE OR MORE OF QUANTIZED FREQUENCY
COEFFICIENT OF RECTANGULAR PREVIOUS
BLOCK (a, b, c, d) ARE NOT '0'

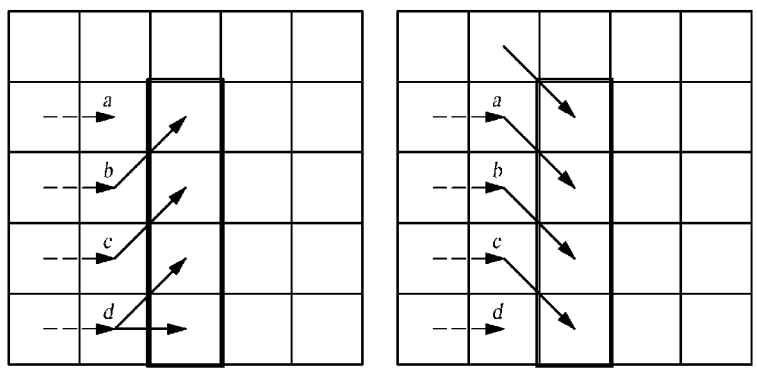

*FIG.24*

IF ALL OF QUANTIZED FREQUENCY
COEFFICIENTS OF RECTANGULAR PREVIOUS
BLOCK (a, b, c, d) ARE '0'

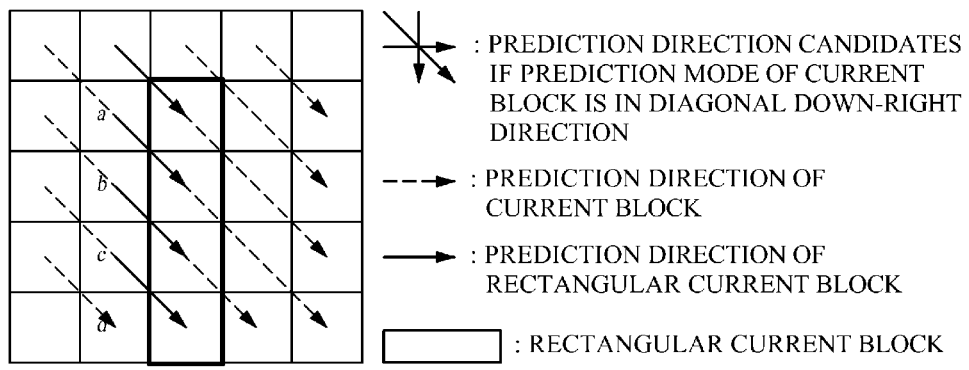

↘ : PREDICTION DIRECTION CANDIDATES
   IF PREDICTION MODE OF CURRENT
   BLOCK IS IN DIAGONAL DOWN-RIGHT
   DIRECTION

--→ : PREDICTION DIRECTION OF
      CURRENT BLOCK

→ : PREDICTION DIRECTION OF
    RECTANGULAR CURRENT BLOCK

☐ : RECTANGULAR CURRENT BLOCK

IF ONE OR MORE OF QUANTIZED FREQUENCY
COEFFICIENT OF RECTANGULAR PREVIOUS
BLOCK (a, b, c, d) ARE NOT '0'

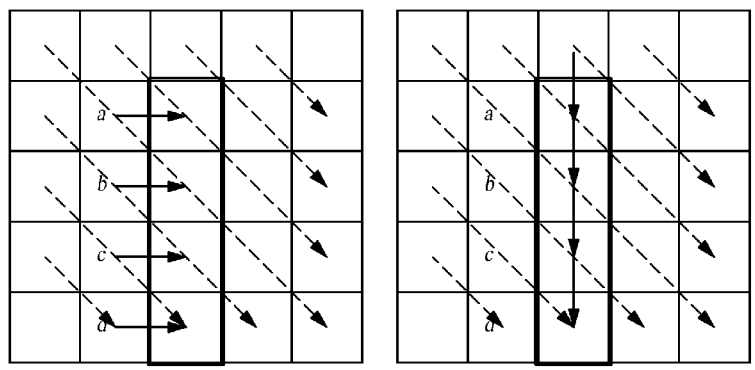

*FIG.25*

IF ALL OF QUANTIZED FREQUENCY
COEFFICIENTS OF RECTANGULAR PREVIOUS
BLOCK (a, b, c, d) ARE '0'

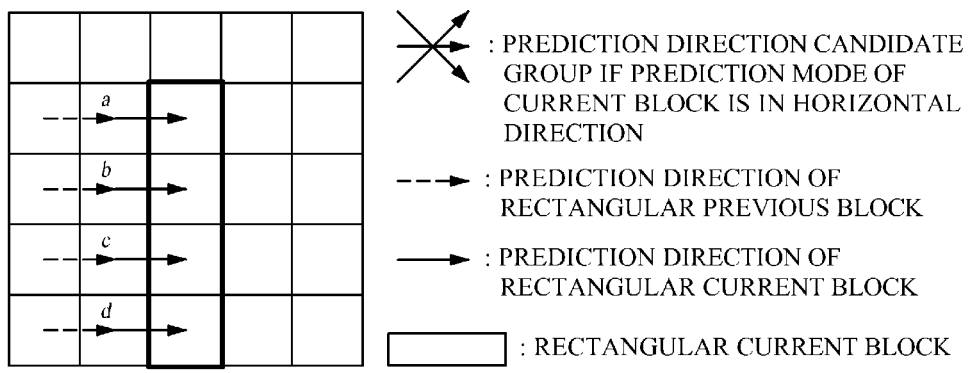

: PREDICTION DIRECTION CANDIDATE
GROUP IF PREDICTION MODE OF
CURRENT BLOCK IS IN HORIZONTAL
DIRECTION

---▶ : PREDICTION DIRECTION OF
RECTANGULAR PREVIOUS BLOCK

——▶ : PREDICTION DIRECTION OF
RECTANGULAR CURRENT BLOCK

: RECTANGULAR CURRENT BLOCK

IF ONE OR MORE OF QUANTIZED FREQUENCY
COEFFICIENT OF RECTANGULAR PREVIOUS
BLOCK (a, b, c, d) ARE NOT '0'

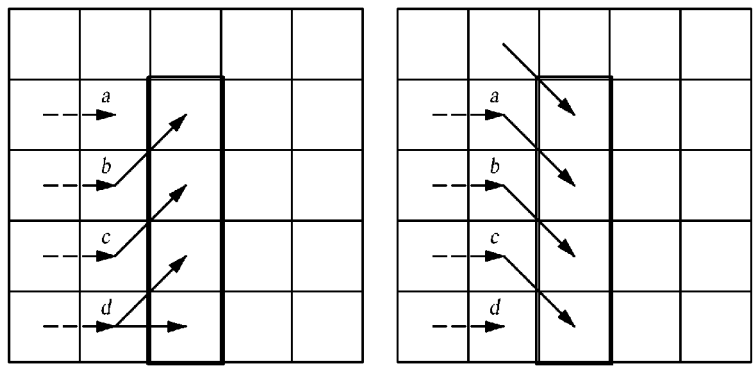

*FIG.29*

IF ALL OF QUANTIZED FREQUENCY
COEFFICIENTS OF RECTANGULAR PREVIOUS
BLOCK (a, b, c, d) ARE '0'
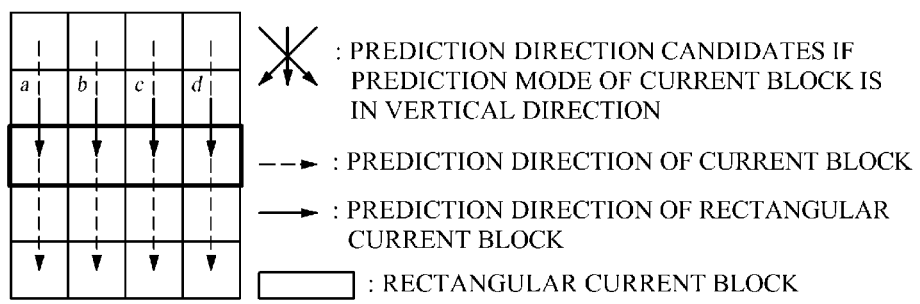
IF ONE OR MORE OF QUANTIZED FREQUENCY
COEFFICIENT OF RECTANGULAR PREVIOUS
BLOCK (a, b, c, d) ARE NOT '0'
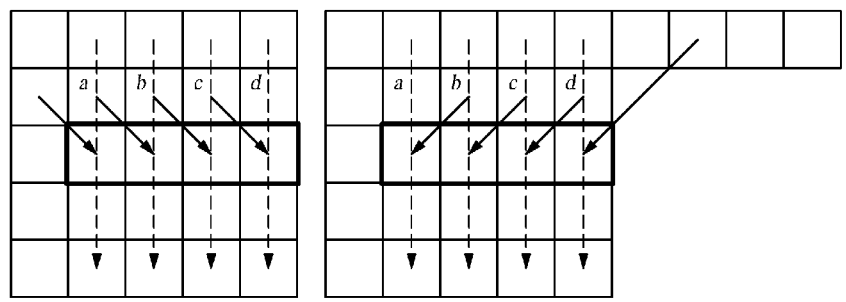
*FIG.30*

DEVICE AND METHOD FOR IMAGE ENCODING/DECODING USING PREDICTION DIRECTION CONVERSION AND SELECTIVE ENCODING

CROSS REFERENCE TO RELATED APPLICATION

This application claims the priority of Korean Patent Application No. 10-2008-0086733, filed on Sep. 3, 2008 and Korean Patent Application No. 10-2008-0087651, filed on Sep. 5, 2008 in the KIPO (Korean Intellectual Property Office), the disclosure of which are incorporated herein in their entirety by reference. Further, this application is the National Phase application of International Application No. PCT/KR2009/004865, filed Aug. 31, 2009, which designates the United States and was published in Korean. Each of these applications is hereby incorporated by reference in their entirety into the present application.

TECHNICAL FIELD

The present disclosure relates to an apparatus and method for encoding/decoding video images using prediction direction change and selective encoding. More particularly, the present disclosure relates to an apparatus and method for encoding/decoding video, which can improve the accuracy of prediction and thus improve the video encoding efficiency by applying different methods of determining a prediction direction for each block to be encoded and selectively determining an encoding mode in encoding or decoding video.

BACKGROUND ART

The statements in this section merely provide background information related to the present disclosure and may not constitute prior art.

Moving Picture Experts Group (MPEG) and Video Coding Experts Group (VCEG) have developed an improved and excellent video compression technology over existing MPEG-4 Part 2 and H.263 standards. The new standard is named H.264/AVC (Advanced Video Coding) and was released simultaneously as MPEG-4 Part 10 AVC and ITU-T Recommendation H.264. Such H.264/AVC (hereinafter referred to as 'H.264') uses a spatial predictive coding method, which is different from conventional video coding international standards such as MPEG-1, MPEG-2, MPEG-4 Part2 Visual and the like.

Conventional video coding methods use "intra prediction" for coefficients transformed in Discrete Cosine Transform Domain (or DCT Transform Domain) in pursuit of higher encoding efficiency, resulting in degradation of the subjective video quality at low band transmission bit rates. However, H.264 adopts an encoding method based on a spatial intra prediction in a spatial domain rather than in a transform domain.

Encoders using an encoding method based on the conventional spatial intra predictions predict a block to be currently encoded from information of the previously encoded and reconstructed previous blocks, encode information on just the difference of the predicted block from the current block to be encoded, and transmit the encoded information to a decoder. At the same time, the encoder may transmit parameters needed for prediction of the block to the decoder, or the encoder and decoder may be synchronized so that they may share the needed parameters for the decoder to predict the block. At the decoder, the desired block to currently decode is created and reconstructed by first predicting its neighboring blocks reproduced previously upon completing their decoding and then obtaining the sum of difference information or residual data transmitted from the encoder and the predicted neighboring block information. Then, again, if the parameters needed for the prediction are transmitted from the encoder, the decoder uses the corresponding one of the parameters in predicting the neighboring block information.

On the other hand, the conventional encoding method based on spatial intra prediction uses only square block modes. This is because a two-dimensional square transform, such as 4×4 transform, 8×8 transform, or the like, is used to improve the transform efficiency. However, in case of using square block modes, pixels in right and lower portions of a block are predicted from pixels which are spatially far apart, and thus the accuracy of prediction of the block is degraded.

DISCLOSURE

Technical Problem

Therefore, the present disclosure has been made in view of the above-mentioned problems, and the present disclosure proposes to improve the accuracy of prediction and thus to improve the video encoding efficiency by varying methods of determining a prediction direction for each block to be encoded and selectively determining an encoding type in encoding or decoding the videos.

Technical Solution

In accordance with an aspect of the present disclosure, there is provided an apparatus for encoding a current block of a video, comprising: a rectangle encoder, upon receiving the current block, for successively encoding the current block by dividing it into rectangular block units and producing a rectangularly encoded bitstream; a square encoder for encoding the current block in square block units and producing a squarely encoded bitstream; and an encoding selector for calculating encoding cost of the rectangularly encoded bitstream and the squarely encoded bitstream and selecting a bitstream having a minimum encoding cost.

Another aspect of the present disclosure provides a method for encoding a current block of a video, comprising: rectangularly and successively encoding the current block at input after dividing it into rectangular block units and generating a rectangularly encoded bitstream; squarely encoding the current block in units of a square block and generating a squarely encoded bitstream; and selecting a bitstream having a minimum encoding cost by calculating encoding cost of the rectangularly encoded bitstream and the squarely encoded bitstream.

Yet another aspect of the present disclosure provides an apparatus for encoding a current block of a video, comprising: a block divider for dividing the current block at receipt into rectangular block units and producing a plurality of rectangular current blocks; a rectangular prediction unit for predicting the plurality of rectangular current blocks successively and outputting a plurality of rectangular predicted blocks; a rectangular subtraction unit for subtracting the plurality of rectangularly predicted blocks from the plurality of rectangular current blocks and generating a plurality of rectangular residual blocks; a rectangular transform unit for transforming the plurality of rectangular residual blocks into a frequency domain; a rectangular quantization unit for quantizing the plurality of transformed rectangular residual blocks; a rectangular scan unit for generating a quantized square residual block by combining the plurality of quantized rectangular residual blocks, and scanning quantized frequency coefficients of the square residual block to generate a string of the quantized frequency coefficients; and an encoder for encoding the quantized frequency coefficient string and generating a bitstream.

Yet another aspect of the present disclosure provides a method for encoding a current block of a video, comprising: dividing the current block upon receipt into rectangular block units and producing a plurality of rectangular current blocks; rectangularly predicting the plurality of rectangular current blocks successively and outputting a plurality of rectangularly predicted blocks; rectangularly subtracting the plurality of rectangularly predicted blocks from the plurality of rectangular current blocks and generating a plurality of rectangular residual blocks; rectangularly transforming the plurality of rectangular residual blocks into a frequency domain; rectangularly quantizing the plurality of transformed rectangular residual blocks; rectangularly scanning quantized frequency coefficients of a square residual block by combining the plurality of quantized rectangular residual blocks, and generating a string of the quantized frequency coefficients; and encoding the quantized frequency coefficient string and generating a bitstream.

Yet another aspect of the present disclosure provides an apparatus for decoding a video, comprising: a prediction mode extractor for extracting information on a prediction mode from a bitstream; a decoder for decoding the bitstream and extracting a string of quantized frequency coefficients; a rectangular reconstruction unit for successively reconstructing current blocks of the video in rectangular block units according to the prediction mode by using the quantized frequency coefficient string; a square reconstruction unit for reconstructing and outputting the current blocks in square block units according to the prediction mode by using the quantized frequency coefficient string; and a bitstream identifier extractor for extracting a bitstream identifier from the bitstream, and controlling the decoder to output the quantized frequency coefficient string to one of the rectangular reconstruction unit and the square reconstruction unit in accordance with the bitstream identifier.

Yet another aspect of the present disclosure provides a method of decoding a video, comprising: extracting information on a prediction mode from a bitstream; extracting a bitstream identifier from the bitstream; decoding the bitstream and extracting a quantized frequency coefficient string; and according to the bitstream identifier, reconstructing and outputting current blocks either successively in rectangular block units or in square block units by using the quantized frequency coefficient string.

Yet another aspect of the present disclosure provides an apparatus for decoding a video, comprising: a rectangular inverse scan unit for inverse scanning quantized frequency coefficients at input after being extracted through decoding of a bitstream to generate a quantized residual block, dividing the quantized residual block in rectangular block units, and producing a plurality of quantized rectangular residual blocks; a rectangular inverse quantization unit for performing inverse quantization of the plurality of quantized rectangular residual blocks; a rectangular inverse transform unit for performing inverse transform of the plurality of inversely quantized rectangular residual blocks into a time domain; a rectangular prediction unit for successively predicting a plurality of rectangular current blocks corresponding to the plurality of inversely transformed rectangular residual blocks, and generating a plurality of rectangularly predicted blocks; and a rectangular addition unit for reconstructing the plurality of rectangular current blocks by adding the plurality of inversely transformed rectangular residual blocks to the plurality of rectangularly predicted blocks, and reconstructing the video by combining the respective rectangular current blocks.

Yet another aspect of the present disclosure provides a method for decoding a video, comprising: rectangularly inverse scanning quantized frequency coefficients at input after being extracted through decoding of a bitstream to generate a quantized residual block, dividing the quantized residual block in rectangular block units, and outputting a plurality of quantized rectangular residual blocks; rectangularly inverse quantizing the plurality of quantized rectangular residual blocks; rectangularly inverse transforming the plurality of inverse quantized rectangular residual blocks into a time domain; rectangularly and successively predicting a plurality of rectangular current blocks corresponding to the plurality of inverse transformed rectangular residual blocks, and generating a plurality of rectangular predicted blocks; and rectangularly adding the plurality of inversely transformed rectangular residual blocks to the plurality of rectangular predicted blocks to reconstruct the plurality of rectangular current blocks and reconstructing the video by combining the respective rectangular current blocks.

Yet another aspect of the present disclosure provides an apparatus for encoding a current block of a video, comprising: a rectangle encoder for successively encoding a plurality of rectangular current blocks generated through division of the current block at input in units of a rectangular block and outputting a rectangularly encoded bitstream; a prediction direction changer for changing prediction directions of the respective rectangular current blocks according to quantized coefficients of rectangular previous blocks encoded prior to the respective rectangular current blocks encoded successively; a square encoder for encoding the current block at input in units of a square block and outputting a squarely encoded bitstream; and an encoding selector for calculating encoding costs of the rectangularly encoded bitstream and the squarely encoded bitstream and outputting the bitstream having the minimum encoding cost.

Yet another aspect of the present disclosure provides a method for encoding a current block of a video, comprising: rectangularly and successively encoding a plurality of rectangular current blocks generated through division of the current block at input in units of a rectangular block and outputting a rectangularly encoded bitstream; changing prediction directions of the respective rectangular current blocks according to quantized coefficients of rectangular previous blocks encoded prior to the respective rectangular current blocks encoded successively; squarely encoding the current block at input in units of a square block and outputting a squarely encoded bitstream; and selecting the bitstream to be encoded by calculating encoding costs of the rectangularly encoded bitstream and the squarely encoded bitstream to output the bitstream having the minimum encoding cost.

Yet another aspect of the present disclosure provides an apparatus for decoding a video, comprising: a prediction mode extractor for extracting information on a prediction mode from a bitstream; a decoder for decoding the bitstream and extracting a quantized frequency coefficient string; a prediction direction changer for extracting a prediction direction identifier from the quantized frequency coefficient string and changing a prediction direction according to the prediction mode; a rectangular reconstruction unit for successively reconstructing and outputting current blocks in rectangular block units according to the changed prediction direction by using the quantized frequency coefficient string; a square reconstruction unit for reconstructing and outputting the current blocks in square block units in the prediction direction according to the prediction mode by using the quantized frequency coefficient string; and a bitstream identifier extractor for extracting a bitstream identifier from the bitstream, and controlling the decoder to output the quantized frequency coefficient string to one of the rectangular reconstruction unit and the square reconstruction unit in accordance with the bitstream identifier.

Yet another aspect of the present disclosure provides a method of decoding a video, comprising: extracting information on a prediction mode from a bitstream; decoding the bitstream and extracting a quantized frequency coefficient string; changing a prediction direction according to the prediction mode by extracting a prediction direction identifier from the quantized frequency coefficient string; extracting a bitstream identifier from the bitstream; according to the bitstream identifier, rectangularly and successively reconstructing and outputting current blocks in rectangular block units according to the changed prediction direction by using the quantized frequency coefficient string; and according to the bitstream identifier, squarely reconstructing and outputting the current blocks in square block units in the prediction direction according to the prediction mode by using the quantized frequency coefficient string.

Yet another aspect of the present disclosure provides an apparatus for changing a prediction direction in predicting a current block of a video for video encoding, wherein the apparatus receives and stores quantized frequency coefficients of a previous block encoded prior to the current block, upon receiving the current block, determines a reference prediction direction as the prediction direction of the current block in case where all of the quantized frequency coefficients of the previous block are '0', and calculates encoding costs of a plurality of prediction direction candidates and determines the prediction direction having the minimum encoding cost as the prediction direction of the current block in case where one or more of the quantized frequency coefficients of the previous block are not '0'.

Yet another aspect of the present disclosure provides an apparatus for changing a prediction direction in predicting a current block of a video for video decoding, wherein the apparatus receives and stores quantized frequency coefficients of a previous block decoded prior to the current block, and when quantized frequency coefficients of the current block are input, determines a reference prediction direction as the prediction direction of the current block in case where all of the quantized frequency coefficients of the previous block are '0', and extracts a prediction direction identifier from the quantized frequency coefficients of the current block and determines the prediction direction that is indicated by the prediction direction identifier as the prediction direction of the current block in case where one or more of the quantized frequency coefficients are not '0'.

Advantageous Effects

As described above, according to the present disclosure, the prediction can be performed by varying methods of determining a prediction direction for each block to be encoded, and the encoding method having a better encoding efficiency can be selected when the videos are encoded or decoded, whereby the accuracy of prediction can be improved, and thus the video encoding efficiency can be improved.

Further areas of applicability will become apparent from the description provided herein. It should be understood that the description and specific examples are intended for purposes of illustration only and are not intended to limit the scope of the present disclosure.

DESCRIPTION OF DRAWINGS

The drawings described herein are for illustration purposes only and are not intended to limit the scope of the present disclosure in any way.

FIG. 12 is an exemplary diagram illustrating a plurality of rectangular residual blocks combined into a square residual block according to a preferred aspect;

FIGS. 24 and 25 are exemplary diagrams illustrating a prediction direction candidate group according to another aspect;

FIGS. 29 and 30 are exemplary diagrams illustrating a prediction direction candidate group according to still another aspect.

MODE FOR INVENTION

Figure 1:
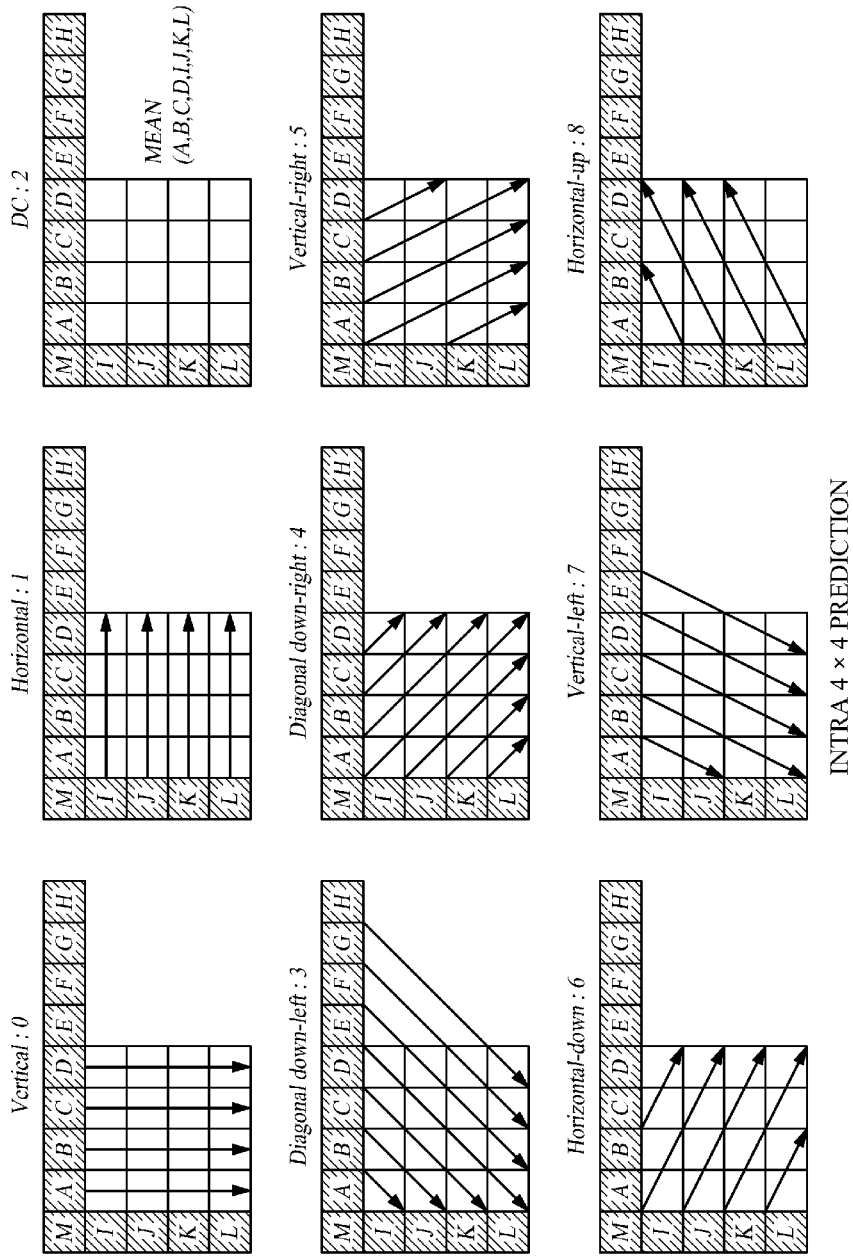
FIG. 1 is an exemplary diagram illustrating typical nine 4×4 intra prediction modes.

Hereinafter, preferred aspects of the present disclosure will be described with reference to the accompanying drawings. It is to be noted that the same elements are indicated with the same reference numerals throughout the drawings. In the following description, a detailed description of known configurations or functions incorporated herein will be omitted when it may make the subject matter of the disclosure rather unclear Also, in describing the components of the present disclosure, there may be terms used like first, second, A, B, (a), and (b). These are solely for the purpose of differentiating one component from the other but not to imply or suggest the substances, order or sequence of the components. If a component is described as 'connected', 'coupled', or 'linked' to another component, they may mean the components are not only directly 'connected', 'coupled', or 'linked' but also are indirectly 'connected', 'coupled', or 'linked' via a third component.

FIG. 1 is an exemplary diagram illustrating typical 9 kinds of 4×4 intra prediction modes.

Examples of intra prediction include an intra_4×4 prediction, intra_16×16 prediction, intra_8×8 prediction, and the like, and each intra prediction includes a plurality of prediction modes. FIG. 1 shows 9 prediction modes in the intra_4×4 prediction.

Referring to FIG. 1, the intra_4×4 prediction has 9 kinds of prediction modes including a vertical mode, a horizontal mode, a DC (Direct Current) mode, a diagonal down-left mode, a diagonal down-right mode, a vertical-right mode, a horizontal-down mode, a vertical-left mode, and a horizontal-up mode.

Although not illustrated, the intra_8×8 prediction has the same prediction modes as those of the intra_4×4 prediction, and the intra_16×16 prediction has four kinds of prediction modes including a vertical mode, a horizontal mode, a DC mode, and a plane mode.

Figure 2:
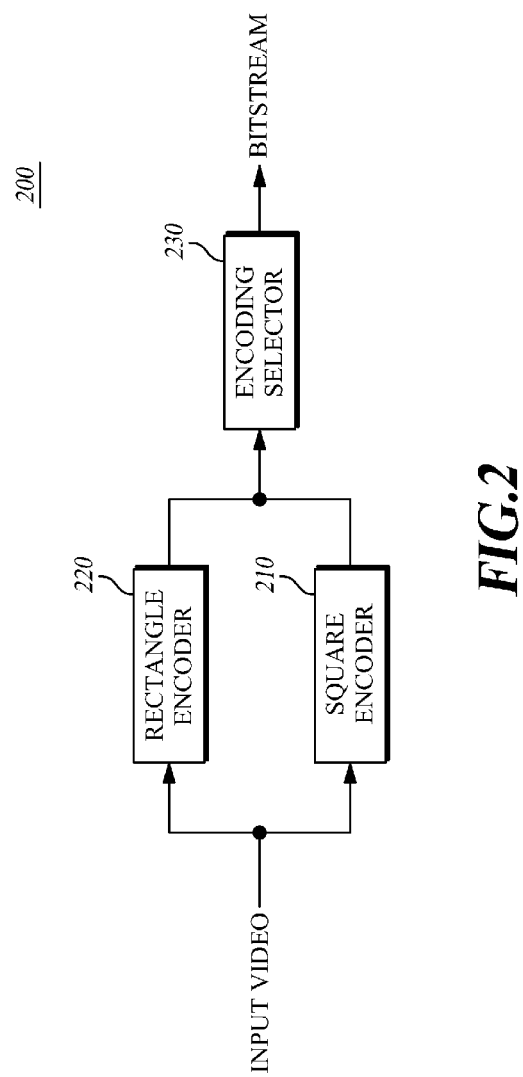
FIG. 2 is a block diagram schematically illustrating the electronic configuration of a video encoding apparatus according to an aspect.

FIG. 2 is a block diagram schematically illustrating the electronic configuration of a video encoding apparatus according to an aspect of the present disclosure.

A video encoding apparatus 200 according to an aspect is an apparatus for encoding video, and may be configured to include a square encoder 210, a rectangle encoder 220, and an encoding selector 230.

The video encoding apparatus 200 may be a personal computer or PC, notebook or laptop computer, personal assistant or PDA, portable multimedia player or PMP, PlayStation Portable or PSP, or mobile communication terminal, smart phone and may mean a variety of apparatuses equipped with, for example, a communication function such as a modem for carrying out communications between various devices or wired/wireless communication networks, a memory for storing various programs for encoding video and related data, and a microprocessor for executing the programs to effect operations and controls thereof.

The square encoder 210, upon receiving a current block of a video, may encode the current block in units of a square block, and output a squarely encoded bitstream. That is, as in a typical moving picture encoding, the square encoder 210 may predict the current block in the square block units according to a predetermined block mode, generate a residual block for the current block, and perform transform, quantization, and encoding of the residual block to output a bitstream. In the present disclosure, the bitstream, which is generated and output from encoding in the square block units, is called a "squarely encoded bitstream".

The rectangle encoder 220, upon receiving the current block of the video, may divide and then successively encode the current block into rectangular block units to output a rectangularly encoded bitstream. That is, unlike the typical encoding, the rectangle encoder 220 may divide the current block according to the predetermined block mode into the rectangular block units in the prediction direction of the current block, predict the respective rectangular blocks successively, perform transform and quantization of the residual blocks, combine the residual blocks into a square block, scan and encode the square block to output the bitstream. In the present disclosure, the bitstream, which is generated and output from encoding successively in the rectangular block units, is called a "rectangularly encoded bitstream".

The encoding selector 230 may calculate a cost for encoding the rectangularly encoded bitstream and a cost for encoding the squarely encoded bitstream, and output the bitstream having a minimum encoding cost. Specifically, the encoding selector 230 calculates the costs for encoding the squarely encoded bitstream from the square encoder 210 and the rectangularly encoded bitstream from the rectangle encoder 220 and compares them to selectively output the bitstream with a less or minimum encoding cost.

Figure 3:
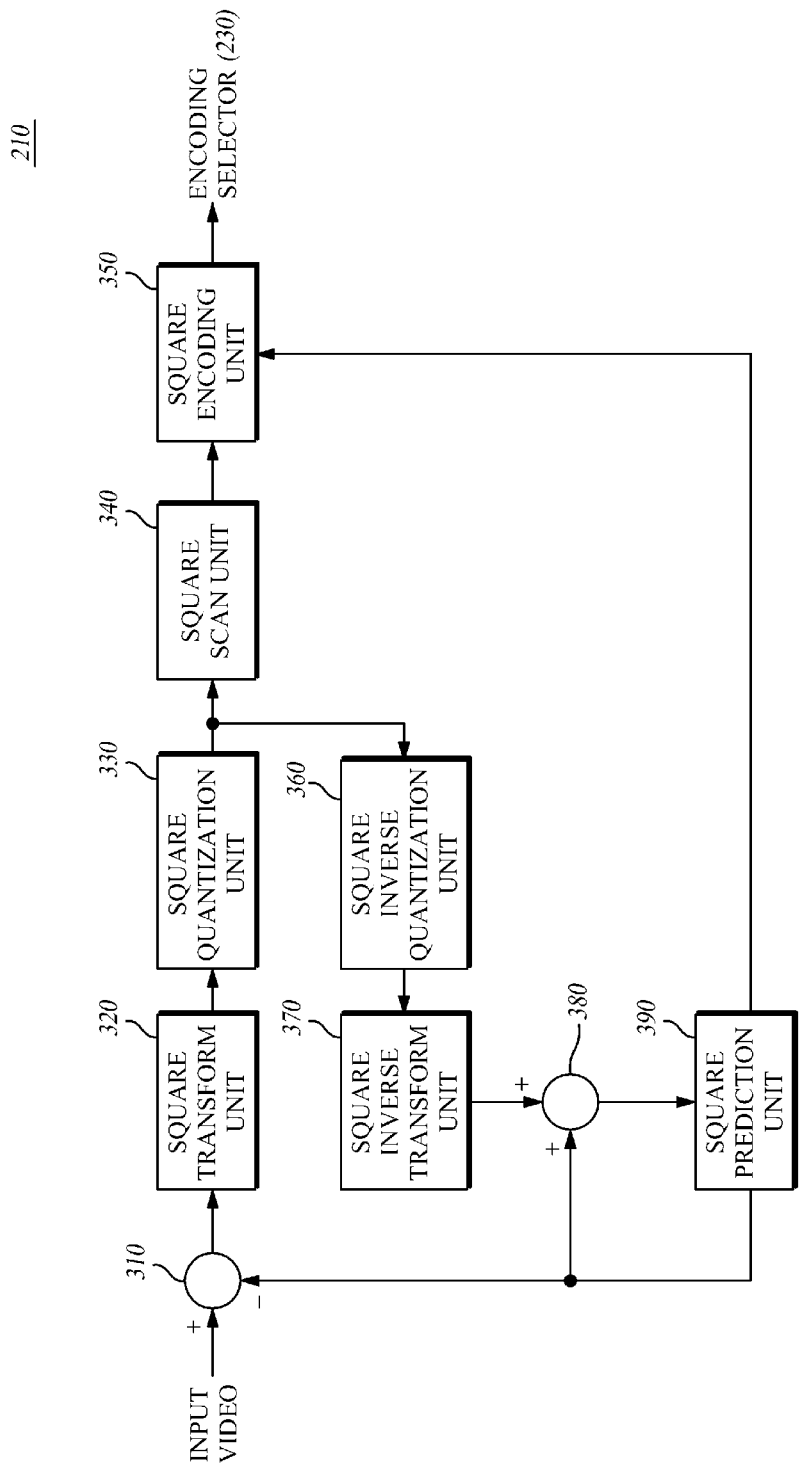
FIG. 3 is a block diagram schematically illustrating the electronic configuration of a squarely encoding device according to an aspect.

FIG. 3 is a block diagram schematically illustrating the electronic configuration of a squarely encoding device according to an aspect of the present disclosure.

The squarely encoding device according to an aspect of the present disclosure may be implemented by the square encoder 210 in FIG. 2, and thus is called the square encoder 210 hereinafter. The square encoder 210 according to an aspect of the present disclosure includes a square subtraction unit 310, a square transform unit 320, a square quantization unit 330, a square scan unit 340, a squarely encoding unit 350, a square inverse quantization unit 360, a square inverse transform unit 370, a square addition unit 380, and a square prediction unit 390.

The square subtraction unit 310 generates a residual block by subtracting the predicted block predicted by the square prediction unit 380 from the current block of the input video, and outputs the residual block. That is, the subtraction unit 310 subtracts a predicted pixel value of each pixel of the predicted block predicted by the square prediction unit 380 from the original pixel value of each pixel of the current block, and generates a residual signal for a difference between the pixel values as the residual block.

The square transform unit 320 generates the residual block having frequency coefficients by transforming the residual block into a frequency domain. Here, the square transform unit 320 may use a DCT (Discrete Cosine Transform) based transform, Hadamard transform, and the like, but is not limited thereto. The square transform unit 320 transforms the residual signal into a frequency domain using diverse transform techniques which are provided by improving and modifying the DCT transform.

The square quantization unit 330 generates the residual block having quantized frequency coefficients by quantizing the residual block transformed by the square transform unit 320. Such a quantization method may use a DZUTQ (Dead Zone Uniform Threshold Quantization), quantization weighted matrix, or the like, but can use diverse quantization methods such as improved quantization or the like.

The square scan unit 340 generates a quantized frequency coefficient string by scanning quantized frequency coefficients of the residual block quantized by the square quantization unit 330 using diverse scanning methods such as a zigzag scan.

The squarely encoding unit 350 encodes the quantized residual blocks into a bitstream. That is, the squarely encoding unit 350 generates a bitstream by encoding the quantized frequency coefficient string that is generated through scanning at the square scan unit 340. Also, the squarely encoding unit 350 can encode not only the quantized residual blocks but also information on the prediction mode or prediction direction determined by the square prediction unit 390 into the bitstream together with the residual blocks. As such an encoding technology, an entropy encoding technology may be used, but is not limited thereto, and other diverse encoding technologies may be used. In the present disclosure, the bitstream output from the squarely encoding unit 350 is called a "squarely encoded bitstream".

The square inverse quantization unit 360 generates inverse-quantized residual blocks by performing an inverse quantization on the quantized residual blocks. That is, the square inverse quantization unit 360 generates the residual blocks having the inverse-quantized frequency coefficients by performing the inverse-quantization of the quantized frequency coefficients of the quantized residual blocks.

The square inverse transform unit 370 generates an inverse-transformed residual block by performing the inverse transform of the inverse-quantized residual block. That is, the square inverse transform unit 370 generates the inverse-transformed residual block having the pixel values by performing the inverse transform on the inverse-quantized frequency coefficients of the inverse-quantized residual block into a time domain.

The square addition unit 380 reconstructs the current block by adding the residual block inverse-transformed by the square inverse transform unit 370 to the predicted block predicted by the square prediction unit 390, and transmits the reconstructed current block to the square prediction unit 390.

The square prediction unit 390 generates the predicted block by predicting the current block. That is, the square prediction unit 390 generates the predicted block having the predicted pixel values as the pixel values of the respective pixels by predicting the pixel values of the respective pixels of the current block of the video to be encoded in accordance with the predetermined block mode and prediction mode. In predicting the respective pixel values of the current block, the pixel values of the previous block previously reconstructed through encoding and decoding are used, i.e. the reconstructed block received from the square addition unit 380 prior to the current block are used.

Figure 4:
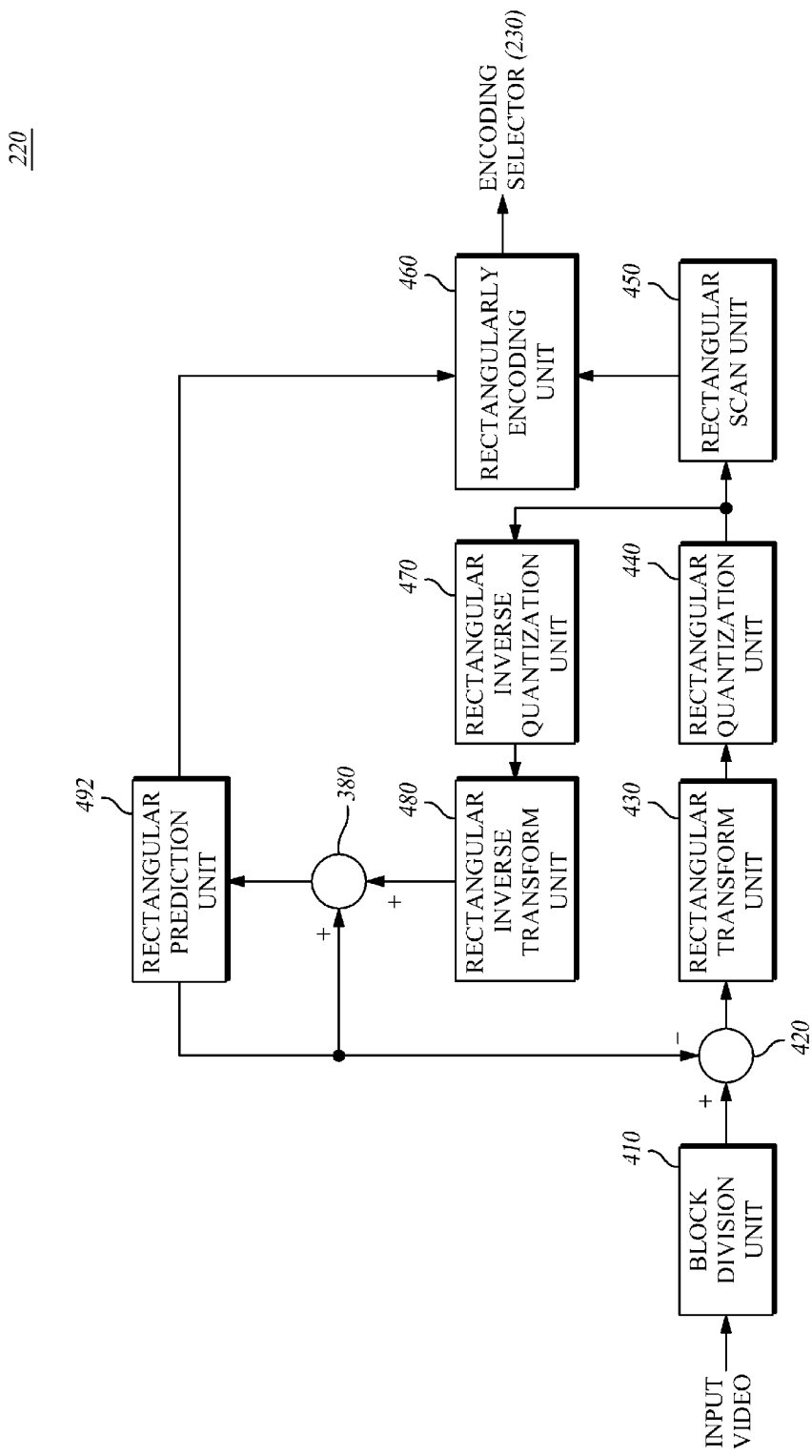
FIG. 4 is a block diagram schematically illustrating the electronic configuration of a rectangularly encoding device according to an aspect.

FIG. 4 is a block diagram schematically illustrating the electronic configuration of a rectangularly encoding device according to an aspect of the present disclosure.

Since the rectangularly encoding device according to an aspect of the present disclosure may be implemented by the rectangle encoder 220 in FIG. 2, it is hereinafter called the rectangle encoder 220. The rectangle encoder 220 according to an aspect of the present disclosure includes a block division unit 410, a rectangular subtraction unit 420, a rectangular transform unit 430, a rectangular quantization unit 440, a rectangular scan unit 450, a rectangularly encoding unit 460, a rectangular inverse quantization unit 470, a rectangular inverse transform unit 480, a rectangular addition unit 490, and a rectangular prediction unit 492.

The block division unit 410, upon receiving the current block of the input video, divides the current block in units of a rectangular block to produce a plurality of rectangular current blocks. Here, the current block is determined as a square block according to the block mode and the encoding mode, and the block division unit 410, in order to improve the prediction performance by predicting the pixels of the current block from the closest neighboring pixel in the intra prediction, divides the current block into rectangular blocks, and predicts successively the respective divided rectangular current blocks.

Also, the block division unit 410 may determine the size of the rectangular blocks according to the prediction direction following the prediction mode of the current block in dividing the square current block into a plurality of rectangular blocks. That is, the rectangular current blocks divided by the block division unit 410 may be N number of N×1 blocks, N/2 N×2 blocks, N number of 1×N blocks, N/2 2×N blocks, and the like. For example, assuming that the block mode of the current block is N×N block, the current block is divided into N number of N×1 blocks in case where the prediction direction according to the prediction mode is the vertical direction, the current block is divided into N number of N×1 blocks in case where the prediction direction according to the prediction mode is the horizontal direction, and the current block is divided into N/M M×M blocks, such as a 1×1 block, a 4×4 block, and the like, in case where the prediction direction mode is the DC mode.

The rectangular subtraction unit 420 generates a plurality of rectangular residual blocks by subtracting a plurality of rectangularly predicted blocks predicted by the rectangular prediction unit 492 from a plurality of rectangular current blocks divided by the block division unit 410.

The rectangular transform unit 430 transforms the plurality of rectangular residual blocks generated by the subtraction unit 420 into a frequency domain. That is, the rectangular transform unit 430 generates the residual blocks having the frequency coefficients by transforming the respective pixel values of the rectangular residual blocks into the frequency domain using a DCT based transform or the like. In this case, the transform of the respective pixel values of the residual blocks in the form of a rectangle into the frequencies may be performed through a matrix transform or the like.

The rectangular quantization unit 440 quantizes a plurality of rectangular residual blocks transformed by the rectangular transform unit 430. That is, the rectangular quantization unit 440 generates the residual blocks having the quantized frequency coefficients by quantizing the frequency coefficients of the plurality of rectangular residual blocks.

The rectangular scan unit 450 generates quantized rectangular residual blocks by combining the plurality of residual blocks quantized by the rectangular quantization unit 440, and generates a quantized frequency coefficient string by scanning the quantized frequency coefficients. That is, the rectangular scan unit 450 generates the residual blocks in the form of a rectangle by combining the respective quantized residual blocks according to the block mode of the current block and the prediction direction of the prediction mode, and generates the quantized frequency coefficient string by scanning the respective quantized frequency coefficients of the residual block in the form of a rectangle.

The rectangularly encoding unit 460 generates a bitstream by encoding the quantized frequency coefficient string generated by the rectangular scan unit 450. That is, the rectangularly encoding unit 460 generates the bitstream by encoding the quantized frequency coefficient string using diverse encoding methods such as entropy encoding and the like. At this time, the rectangularly encoding unit 460 may additionally encode the prediction mode of the current block.

As described above, the method of encoding current blocks of the input video that is performed by the rectangle encoder as described above with reference to FIG. 5 will now be described. The rectangle encoder, upon receiving the current block of the input video, divides the current block in units of a rectangular block to produce a plurality of rectangular current blocks, produces a plurality of rectangularly predicted blocks by successively predicting the plurality of rectangular current blocks, generates a plurality of rectangular residual blocks by subtracting the plurality of rectangularly predicted blocks from the plurality of rectangular current blocks, transforms the plurality of rectangular residual blocks into a frequency domain, quantizes the plurality of transformed rectangular residual blocks, generates the quantized square residual block by combining the plurality of quantized rectangular residual blocks, generates the quantized frequency coefficient string by scanning the quantized frequency coefficients by scanning the quantized frequency coefficients of the square residual blocks, and generates a bitstream by encoding the quantized frequency coefficient string.

Figure 5:
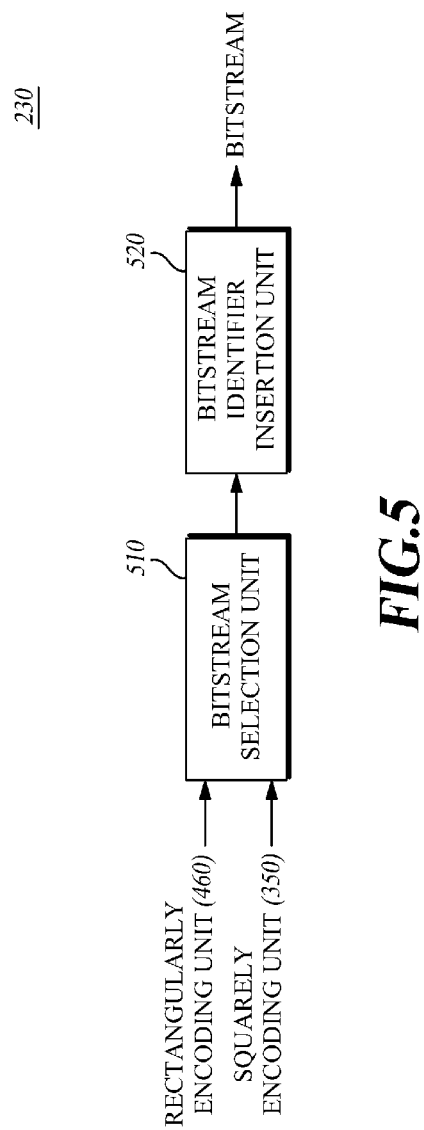
FIG. 5 is a block diagram schematically illustrating the electronic configuration of an encoding selection device according to an aspect.

FIG. 5 is a block diagram schematically illustrating the electronic configuration of an encoding selection device according to an aspect of the present disclosure.

Since the encoding selection device according to an aspect of the present disclosure may be implemented by the encoding selector 230 in FIG. 2, it is hereinafter called the encoding selector 230. The encoding selector 230 according to an aspect of the present disclosure includes a bitstream selection unit 510 and a bitstream identifier insertion unit 520.

When the bitstream selection unit 510 receives a rectangularly encoded bitstream from the rectangularly encoding unit 460 and a squarely encoded bitstream from the squarely encoding unit 350, it calculates a rectangularly encoding efficiency and a square encoding efficiency, and outputs a bitstream according to an encoding method having a higher encoding efficiency. Here, the encoding efficiency may be calculated as an encoding cost, and the encoding method having a minimum encoding cost may be determined as the encoding method having a higher encoding efficiency.

The bitstream identifier insertion unit 520 generates an identifier for identifying a bitstream generated by the bitstream selection unit 510, and inserts the identifier into the bitstream output from the bitstream selection unit 510.

Figure 6:
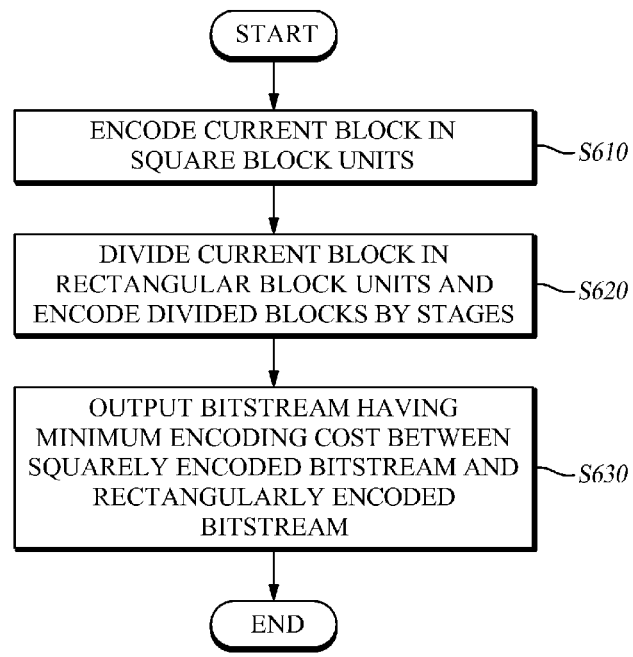
FIG. 6 is a flowchart illustrating a video encoding method according to an aspect.

FIG. 6 is a flowchart illustrating a video encoding method according to an aspect of the present disclosure.

The video encoding apparatus 200 generates a squarely encoded bitstream (step S610) by encoding the current block of the input video in units of a square, and generates a rectangularly encoded bitstream (step S620) by dividing the current block in units of a rectangular block and encoding the rectangular blocks by stages.

Once the square bitstream and the rectangular bitstream are generated, the video encoding apparatus 200 calculates the encoding efficiency of the squarely encoded bitstream and the encoding efficiency of the rectangularly encoded bitstream, and produces the encoded bitstream having a higher encoding efficiency (step S630). Here, the encoding efficiency may be an encoding cost required to encode the respective encoded bitstreams, and in case the encoding cost is small, it may be determined that the encoding efficiency is high. Also, the video encoding apparatus 200 may insert a bitstream identifier into the bitstream so that the video decoding apparatus can identify whether the corresponding bitstream is the bitstream encoded using the square encoding or the bitstream encoded using the rectangular encoding, while producing a bitstream having a higher encoding efficiency.

Figure 7:
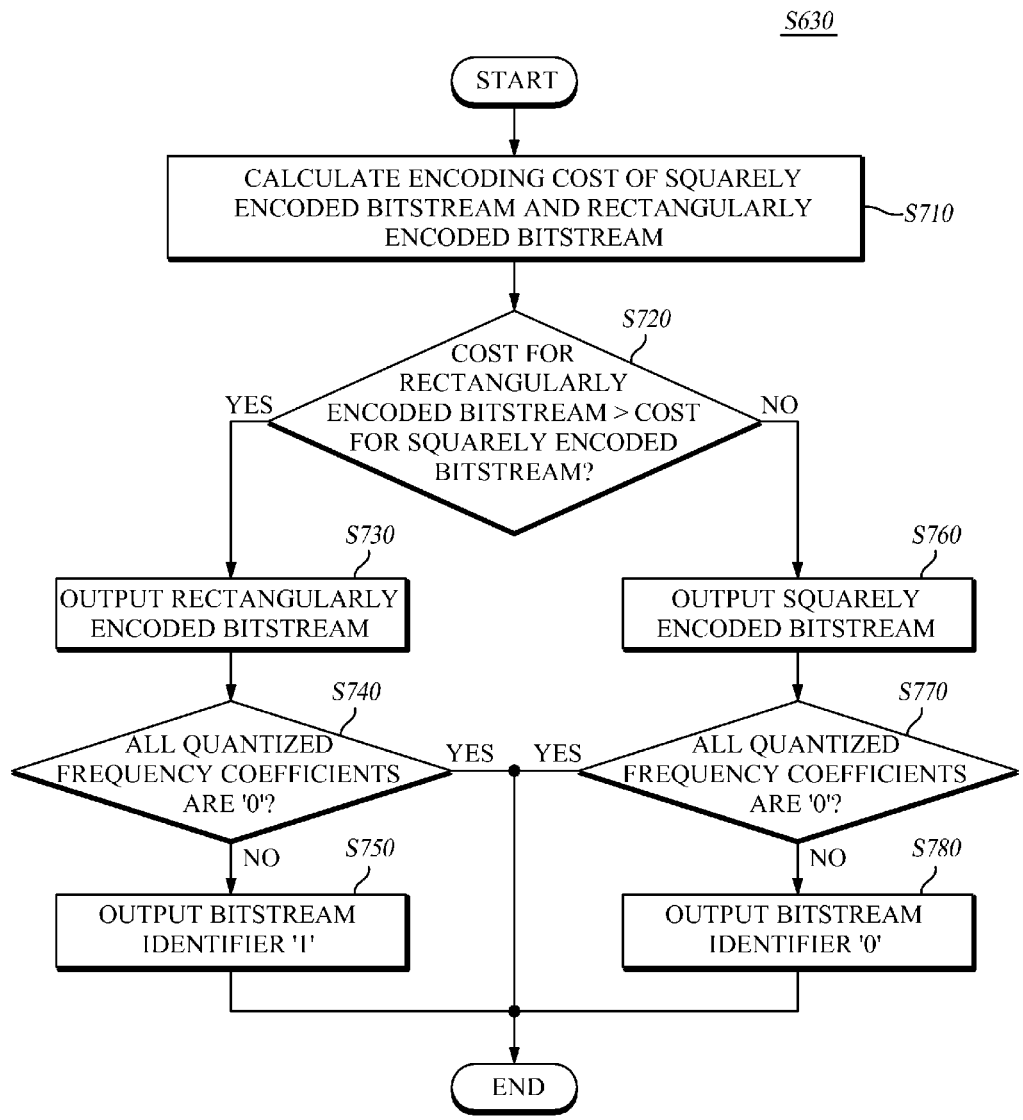
FIG. 7 is a flowchart illustrating a bitstream selection process according to an aspect.

FIG. 7 is a flowchart illustrating a bitstream selection process according to an aspect of the present disclosure.

In the video encoding method according to an aspect of the present disclosure as described above with reference to FIG. 6, the step of producing the bitstream having a higher encoding efficiency as in step S630 may be performed through a process as shown in FIG. 7.

The encoding selection unit 230 of the video encoding apparatus 200 calculates the encoding cost of the squarely encoded bitstream and the encoding cost of the rectangularly encoded bitstream (step S710) in order to obtain the encoding efficiencies of the squarely encoded bitstream and the rectangularly encoded bitstream. Here, although the encoding cost may be a rate-distortion cost (RD cost), another encoding cost may also be used.

The video encoding apparatus 200, which has calculated the encoding costs, compares the encoding cost of the rectangularly encoded bitstream with the encoding cost of the squarely encoded bitstream (step S720), and if the encoding cost of the rectangularly encoded bitstream is lower than the encoding cost of the squarely encoded bitstream, it outputs the rectangularly encoded bitstream (step S730).

Also, the video encoding apparatus 200 checks if all of the quantized frequency coefficients of the quantized frequency coefficient string which have been encoded into the rectangularly encoded bitstream, are '0' (step S740). If at least one of the quantized frequency coefficients is not '0', it sets a bitstream identifier as '1', and produces the bitstream identifier together with the rectangularly encoded bitstream (step S750). If all of the quantized frequency coefficients of the quantized frequency coefficient string are '0', the video encoding apparatus 200 generates the bitstream identifier, but may not output the generated bitstream identifier. That is, if all of the quantized frequency coefficients of the corresponding bitstream are '0', the video decoding apparatus can perform the decoding through a typical decoding that decodes all of the rectangularly encoded bitstream and the squarely encoded bitstream in units of a square block. Accordingly, the bitstream identifier need not be generated, which in turn saves bits for the bitstream identifier.

Also, if the encoding cost of the rectangularly encoded bitstream is equal to or higher than the encoding cost of the squarely encoded bitstream as a result of comparison at step S720, the video encoding apparatus 200 outputs the squarely encoded bitstream (step S760). Also, the video encoding apparatus 200 conforms whether all of the quantized frequency coefficients of the quantized frequency coefficient string encoded into the squarely encoded bitstream are '0' (step S770), and if at least one of the quantized frequency coefficients is not '0', it generates the bitstream identifier as '0', and outputs the bitstream identifier together with the squarely encoded bitstream (step S780). If all the quantized frequency coefficients are '0', the video encoding apparatus 200 generates the bitstream identifier, but may not output the generated bitstream identifier. That is, if all of the quantized frequency coefficients of the corresponding bitstream are '0', the video decoding apparatus can perform the decoding through a typical decoding method that decodes all of the rectangularly encoded bitstream and the squarely encoded bitstream in units of a square block. Accordingly, the bitstream identifier need not be generated, which in turn saves bits for the bitstream identifier.

Figure 8:
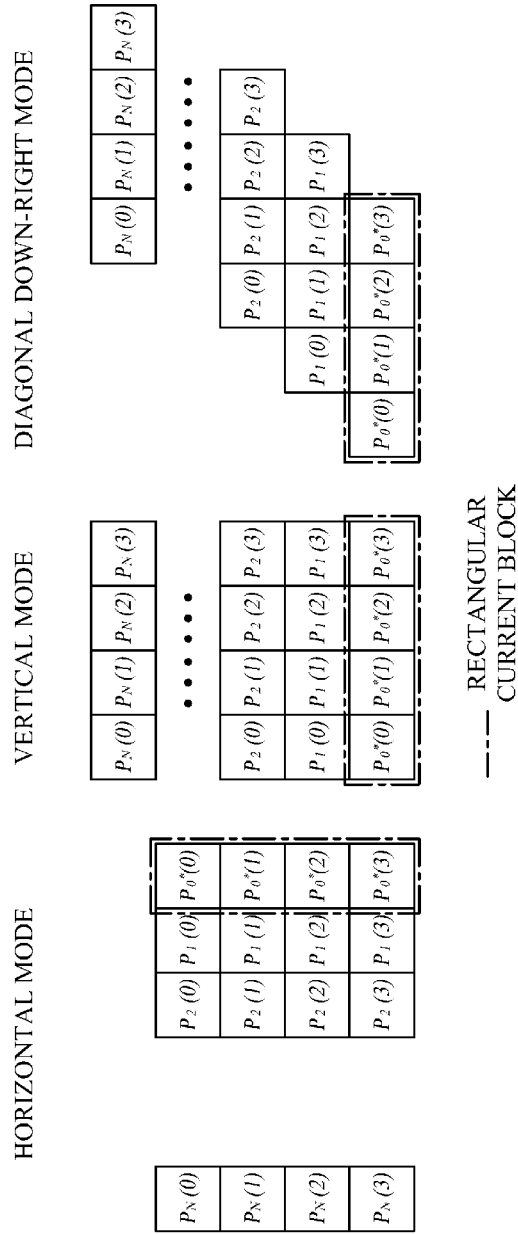
FIG. 8 is an exemplary diagram illustrating a current rectangular block according to an aspect.

FIG. 8 is an exemplary diagram illustrating a current rectangular block according to an aspect of the present disclosure.

In FIG. 8, it is assumed that the block mode of the current block is a 4×4 block mode, and the rectangular current block that is generated by dividing the current block in units of a rectangular block according to the prediction mode is illustrated as an example.

If the prediction mode of the current block is a horizontal mode, the rectangular current block, as shown in the drawing, is divided into rectangular current blocks having a size of 1×4, while if the prediction mode of the current block is a vertical mode, the rectangular current block is divided into rectangular current blocks having a size of 4×1. If the prediction mode is a diagonal down-right mode, the rectangular current block is divided into rectangular current blocks having a size of 4×1 in a similar manner to the vertical mode.

In FIG. 8, $P_0^*(m)$ (m=0, 1, 2, 3) in the rectangular current block indicate the predicted pixels predicted by the rectangular prediction unit 492, and $P_n(m)$ (m=0, 1, 2, 3, n=0, 1, ..., N) indicates the pixels reconstructed prior to the rectangular current block according to the prediction direction.

The rectangular prediction unit 492 can calculate the predicted pixel values of the respective pixels of the rectangularly predicted block as in Equation 1 when generating the rectangularly predicted block by predicting the rectangular current block.

$$p_0(m) = \sum_{n=1}^{n=N} \alpha_n p_n(m) \quad \text{Equation 1}$$

$$\sum_{n=1}^{n=N} \alpha_n = 1$$

Here, $\alpha_n$ is a pixel weighted value that can be adjusted by a user.

Figure 9:
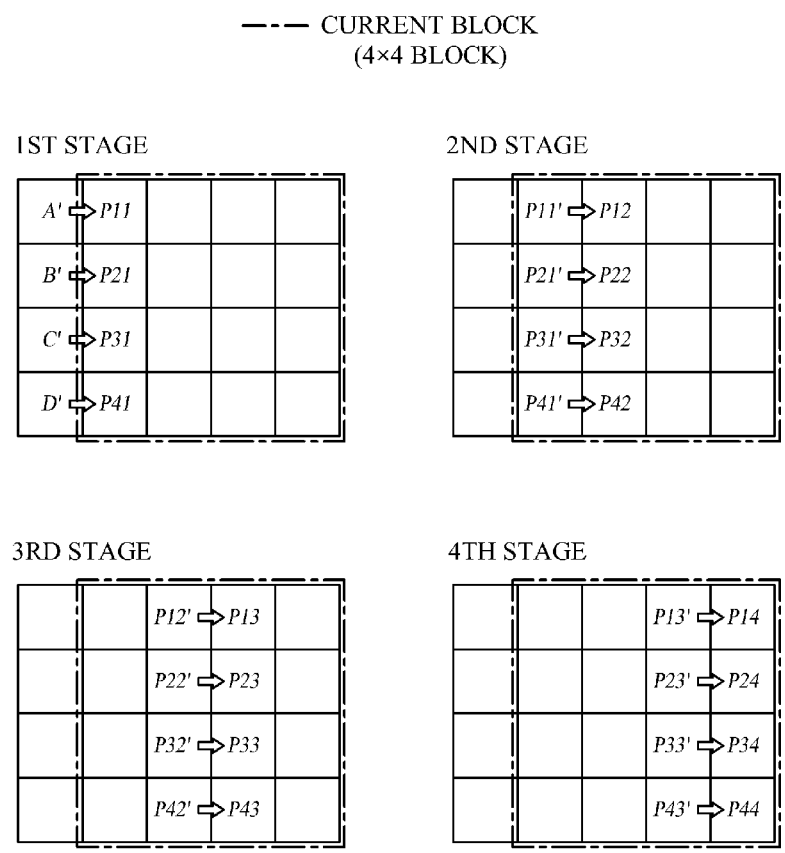
FIG. 9 is an exemplary diagram illustrating a process of performing an intra prediction successively through a rectangular prediction unit according to an aspect.

FIG. 9 is an exemplary diagram illustrating a process of successively performing an intra prediction through a rectangular prediction unit according to an aspect of the present disclosure.

In FIG. 9, a successive prediction process through division of the current block having a size of 4×4 into a plurality of rectangular current blocks is shown in case where N=1 and $\alpha_1=1$ in Equation 1 and the prediction mode is a horizontal mode.

As shown in FIG. 9, at the first stage, pixels P11, P21, P31, and P41 of the first rectangular current block of the current block are predicted using pixels A', B', C', and D' of the rectangular previous block previously encoded and reconstructed, and a rectangularly reconstructed block is generated by encoding and reconstructing the rectangular residual block having the residual signal. The rectangularly reconstructed block has pixels of P11', P21', P31', and P41'.

At the second stage, pixels P12, P22, P32, and P42 of the second rectangular current block of the current block are predicted using pixels P11', P21', P31', and P41' of the rectangular previous block previously encoded and reconstructed, and a rectangularly reconstructed block is generated by encoding and reconstructing the rectangular residual block having the residual signal. The rectangularly reconstructed block has pixels of P12', P22', P32', and P42'.

At the third stage, pixels P13, P23, P33, and P43 of the third rectangular current block of the current block are predicted using pixels P12', P22', P32', and P42' of the rectangular previous block previously encoded and reconstructed, and a rectangularly reconstructed block is generated by encoding and reconstructing the rectangular residual block having the residual signal. The rectangularly reconstructed block has pixels of P13', P23', P33', and P43'.

At the fourth stage, pixels P14, P24, P34, and P44 of the fourth rectangular current block of the current block are predicted using pixels P13', P23', P33', and P43' of the rectangular previous block previously encoded and reconstructed, and a rectangularly reconstructed block is generated by encoding and reconstructing the rectangular residual block having the residual signal. The rectangularly reconstructed block has pixels of P14', P24', P34', and P44'.

As described above, the rectangular prediction unit 492 predicts the plurality of rectangular current blocks of the current block, and the term "successive prediction" is not to simultaneously predict all of the rectangular current blocks, but to predict the respective rectangular current blocks using the pixels of the rectangular previous block previously encoded and reconstructed.

Figure 10:
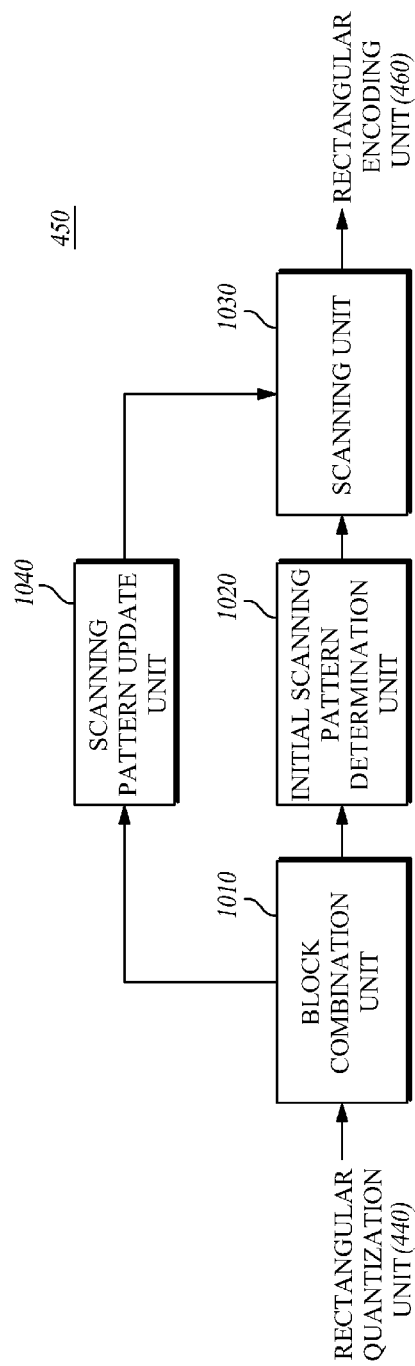
FIG. 10 is a block diagram schematically illustrating the electronic configuration of a rectangularly scanning device according to an aspect.

FIG. 10 is a block diagram schematically illustrating the electronic configuration of a rectangularly scanning device according to an aspect of the present disclosure.

The rectangularly scanning device according to an aspect of the present disclosure may be implemented by a rectangular scan unit 450 in FIG. 4. Hereinafter, the rectangularly scanning device according to an aspect of the present disclosure is called the rectangular scan unit 450.

The rectangular scan unit 450 according to an aspect of the present disclosure includes a block combination unit 1010, an initial scanning pattern determination unit 1020, a scanning unit 1030, and a scanning pattern update unit 1040.

The block combination unit 1010 generates quantized square residual blocks in the form of a square by combining a plurality of quantized rectangular residual blocks transferred from the rectangular quantization unit 440 in accordance with the prediction direction according to the prediction mode of the current block. For example, the block combination unit 1010 can generate the residual block in the form of a square by combining the plurality of quantized residual blocks to match the block size according to the corresponding block mode and according to the prediction direction of the prediction mode. That is, if the plurality of quantized residual blocks includes four 4×1 blocks, the block combination unit 1010 can generate the quantized residual block having a block size of 4×4 by combining the four 4×1 blocks in order in the vertical direction that is the prediction direction.

The initial scanning pattern determination unit 1020 determines the initial scanning pattern to scan the quantized frequency coefficients of the quantized square residual blocks combined by the block combination unit 1010. At this time, the initial scanning pattern determination unit 1020 determines the initial scanning pattern according to the size of the video. For example, if the size of the video is equal to or larger than a preset size, the initial scanning pattern determination unit 1020 can determine the initial scanning pattern by assigning priorities to the coefficients of the DC component among the quantized frequency coefficients of the square residual block and the lowermost coefficients of the square residual block, and further by assigning a higher priority to the coefficients of the DC component. Also, if the size of the video is smaller than the preset size, the initial scanning pattern determination unit 1020 can determine the initial scanning pattern by assigning the same priority to the coefficients of the DC component among the quantized frequency coefficients of the square residual block and the lowermost coefficients of the square residual block.

The scanning unit 1030 generates a quantized frequency coefficient string by scanning the quantized frequency coefficients of the quantized residual block according to the determined scanning pattern (the initial scanning pattern determined by the initial scanning pattern determination unit 1020 or the updated scanning pattern determined by the scanning pattern update unit 1040).

The scanning pattern update unit 1040 can adaptively update the scanning pattern according to the probability of the occurrence of non-zero quantized frequency coefficients in respective positions of the square residual block. For example, the scanning pattern update unit 1040 can adaptively update the scanning pattern by calculating the probability of the occurrence of non-zero quantized frequency coefficients in the respective positions of the square residual block whenever the video encoding apparatus 200 encodes the current block, and determining the scanning order in the order of high probabilities.

Figure 11:
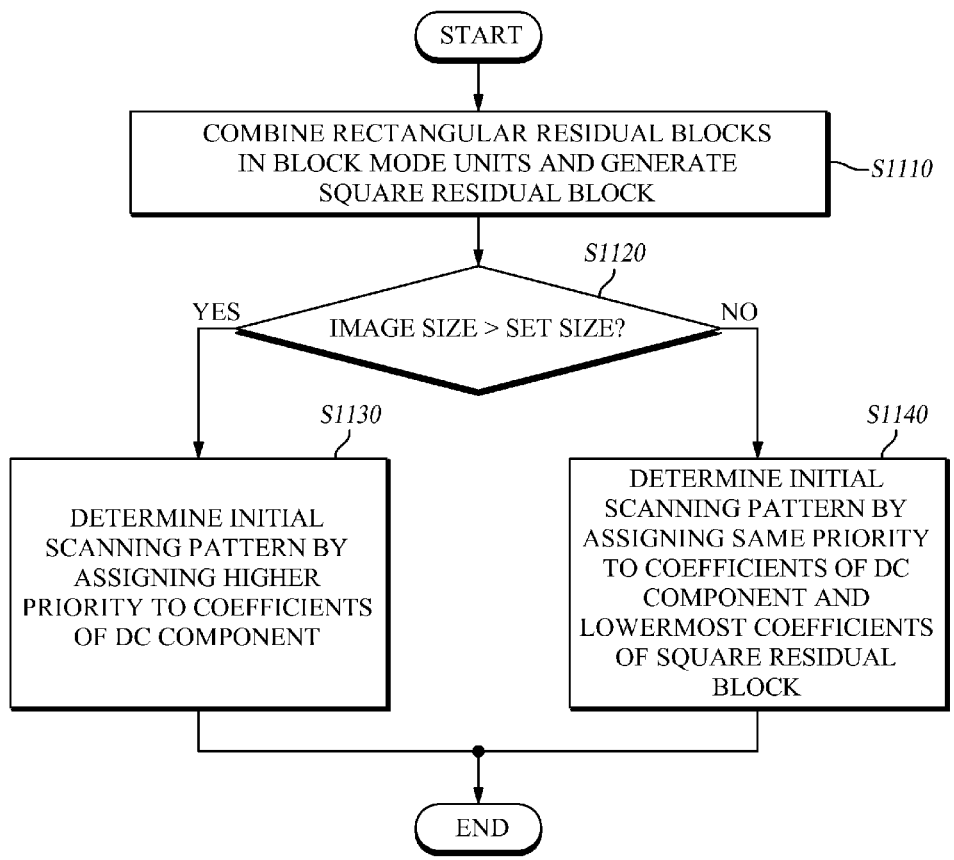
FIG. 11 is a flowchart illustrating a method of determining an initial scanning pattern according to an aspect.

FIG. 11 is a flowchart illustrating a method of determining an initial scanning pattern according to an aspect of the present disclosure.

The rectangular scan unit 450 generates the square residual block (step S1110) by combining the plurality of quantized rectangular residual blocks in a block mode unit, and checks whether the size of the video to which the current block belongs is larger than the preset size (step S1120). If the size of the video is larger than the preset size, the rectangular scan unit 450 determines the initial scanning pattern (step S1130) by assigning the priorities to the coefficients of the DC component among the quantized frequency coefficients of the square residual block and the lowermost coefficients of the square residual block, and further by assigning a higher priority to the coefficients of the DC component. If the size of the video is smaller than the preset size, the initial scanning pattern determination unit 1020 can determine the initial scanning pattern (step S1140) by assigning the same priority to the coefficients of the DC component among the quantized frequency coefficients of the square residual block and the lowermost coefficients of the square residual block.

FIG. 12 is an exemplary diagram illustrating a plurality of rectangular residual blocks combined into a square residual block according to a preferred aspect of the present disclosure.

In FIG. 12, it is exemplified that if the prediction mode of the current block is a vertical mode, a plurality of rectangular residual blocks are combined in units of 4×4 block mode or 8×8 block mode, and a square residual block composed of quantized frequency coefficients is created.

The square residual block combined in the 4×4 block mode is obtained through combination of the rectangular residual blocks having a size of 4×1 in a vertical direction, and the square residual block combined in the 8×8 block mode is obtained through the combination of the rectangular residual blocks having a size of 8×1 in the vertical direction.

Since the current block is divided into a plurality of rectangular current blocks and residual blocks of the respective rectangular current blocks are transformed and quantized, the quantized frequency coefficients of the DC component are positioned on the left hand side of the respective quantized rectangular residual blocks. Accordingly, the coefficients of the DC component are driven into the left hand side of the quantized square residual blocks combined in units of a square block.

Figure 13:
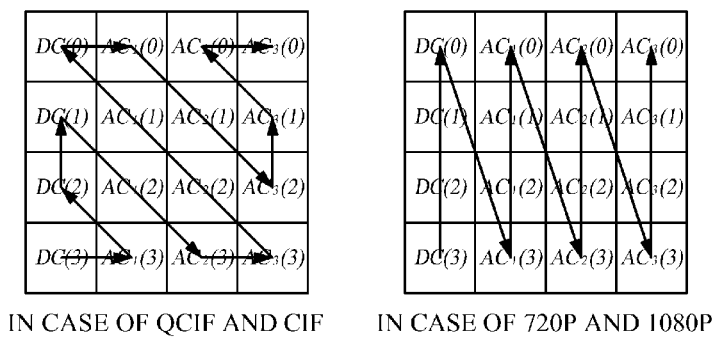
FIG. 13 is an exemplary diagram illustrating a process of determining an initial scanning pattern according to an aspect.

FIG. 13 is an exemplary diagram illustrating a process of determining an initial scanning pattern according to an aspect of the present disclosure.

Typically, in the square-shaped square residual blocks, non-zero values occur frequently in the coefficients of the DC component and in the coefficients in the lowermost portion of the residual block. Accordingly, by preferentially scanning the coefficients of the DC component and the lowermost portion which have a high probability that the values which are not '0' occur, the encoding efficiency can be improved.

On the other hand, the probability that the values which are not '0' occur in the quantized frequency coefficients of the square residual block varies according to the size of the video. If the size of the video becomes larger, the probability that the values which are not '0' occur in the coefficients of the DC component becomes higher than the probability that the values which are not '0' occur in the coefficients in the lowermost portion. Accordingly, in the present disclosure, the initial scanning pattern is determined according to the size of the video.

For example, if the size of the video is equal to or larger than a preset size, given that a threshold size to be compared with the size of the video is preset, the initial scanning pattern can be determined by assigning priorities to the coefficients of the DC component among the quantized frequency coefficients of the square residual block and the lowermost coefficients of the square residual block, and further by assigning a higher priority to the coefficients of the DC component. Also, if the size of the video is smaller than the preset size, the initial scanning pattern can be determined by assigning the same priority to the coefficients of the DC component among the quantized frequency coefficients of the square residual block and the lowermost coefficients of the square residual block.

FIG. 13 exemplarily shows the initial scanning pattern that is determined when the preset size is set to 720p. In case where the size of the video is QCIF or CIF, it is determined that the size of the video is smaller than the preset size, and the initial scanning pattern may be determined by assigning the same priority to the coefficients of the DC component and the lowermost coefficients of the square residual block. In this case, the initial scanning pattern is determined in the order of $AC_1(3)$, $DC(2)$, $DC(1)$, $AC_1(2)$, $AC_1(3)$, . . . , $AC_3(0)$, starting from $DC(3)$, as indicated by arrows.

Also, in case where the size of the video is 720p or 1080p, it is determined that the size of the video is equal to or larger than the preset size, and the initial scanning pattern may be determined by assigning a higher priority to the coefficients of the DC component. In this case, the initial scanning pattern is determined in the order of $DC(3)$, $DC(2)$, $DC(0)$, $AC_1(3)$, $AC_1(2)$, . . . , $AC_3(0)$, as indicated by arrows.

Figure 14:
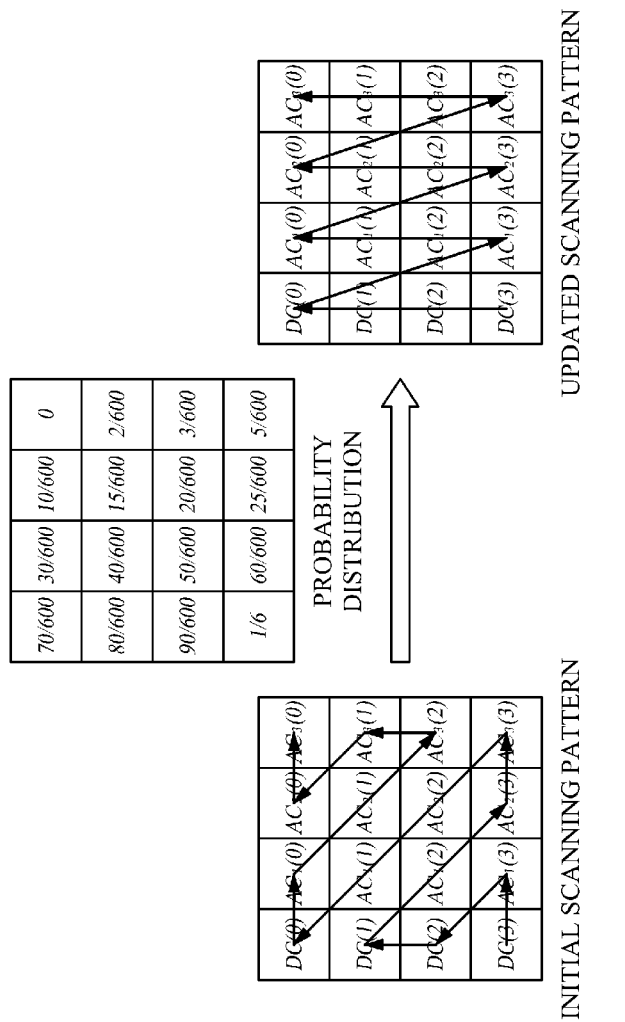
FIG. 14 is an exemplary diagram illustrating a process of updating a scanning pattern according to an aspect.

FIG. 14 is an exemplary diagram illustrating a process of updating a scanning pattern according to an aspect of the present disclosure.

As described above with reference to FIG. 13, if the initial scanning pattern is determined, the rectangular scan unit 450 generates a quantized frequency coefficient string by scanning the quantized frequency coefficients of the quantized square residual block according to the initial scanning pattern, and generates a rectangularly encoded bitstream by encoding the quantized frequency coefficients. Thereafter, if the next block is received subsequent to the current block, the input block is again divided into a plurality of rectangular next blocks, their residual blocks are transformed and quantized, and the square residual blocks are combined into a square residual block to be scanned. Whenever this process is repeated, the scanning is not performed using the initial scanning pattern initially determined, but is performed by adaptively updating the scanning pattern.

At this time, the criteria used in adaptively updating the scanning pattern may be the probability of the occurrence of non-zero quantized frequency coefficients in each position of the square residual block. For example, the scanning pattern can be adaptively updated by calculating the probability of the occurrence of non-zero quantized frequency coefficients whenever the plurality of blocks of the video is encoded, and determining the scanning order in the order of high probability.

As shown in FIG. 14, when the encoding is completed upon determining the initial scanning pattern and scanning the corresponding square residual block, a process of encoding the next block is performed. By repeating the process, the probability of the occurrence of non-zero quantized frequency coefficients in each position of the quantized frequency coefficients is calculated whenever the encoding is performed at least once. For example, as illustrated, the probability of the occurrence of non-zero quantized frequency coefficients in each position may be calculated, and in this case, the updated scanning pattern may be determined by determining the scanning pattern in the order of high probability.

As described above, the video encoded into a bitstream by the video encoding apparatus 200 is transmitted in real time or in non-real time to the video decoding apparatus to be described later through a wired/wireless communication network, such as the Internet, local area wireless communication network, wireless LAN network, WiBro network, mobile communication network, and the like, or a communication interface, such as a cable, a USB (Universal Serial Bus), and the like. The video transmitted to the video decoding apparatus is decoded to be reconstructed and reproduced.

Figure 15:
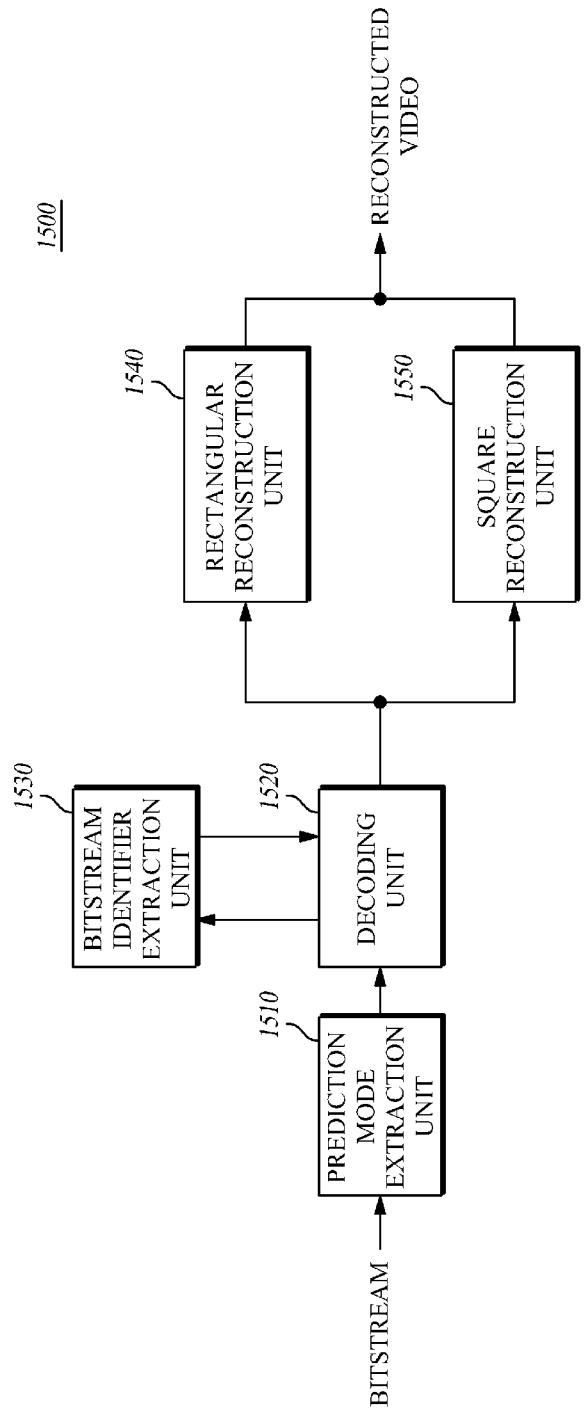
FIG. 15 is a block diagram schematically illustrating the electronic configuration of a video decoding apparatus according to an aspect.

FIG. 15 is a block diagram schematically illustrating the electronic configuration of a video decoding apparatus according to an aspect of the present disclosure.

A video decoding apparatus 1500 according to an aspect of the present disclosure includes a prediction mode extraction unit 1510, a decoding unit 1520, a bitstream identifier extraction unit 1530, a rectangular reconstruction unit 1540, and a square reconstruction unit 1550.

The video decoding apparatus 1500 may be a PC (Personal Computer), notebook or laptop computer, personal assistant or PDA, portable multimedia player or PMP, PlayStation Portable or PSP, or mobile communication terminal, and may mean a variety of apparatuses equipped with, for example, a communication system such as a modem for carrying out communications between various devices or wired/wireless communication networks, a memory for storing various programs for encoding videos and related data, and a microprocessor for executing the programs to effect operations and controls thereof.

The prediction mode extraction unit 1510 extracts information on the prediction mode from the bitstream. Here, the information on the prediction mode is information for identifying the prediction mode of the current block that is determined by the video encoding apparatus 200, and includes information on whether the prediction mode of the current block is a horizontal mode, vertical mode, or DC mode.

The decoding unit 1520 extracts a quantized frequency coefficient string by decoding the bitstream. The decoding unit 1520, when extracting and generating the quantized frequency coefficient string, generates the quantized frequency coefficient string to either the rectangular reconstruction unit 1540 or the square reconstruction unit 1550 under the control of the bitstream identifier extraction unit 1530.

The bitstream identifier extraction unit 1530 extracts the bitstream identifier from the bitstream using the quantized frequency coefficient string, and controls the decoding unit 1520 to output the quantized frequency coefficient string to one of the rectangular reconstruction unit 1540 and the square reconstruction unit 1550 according to the extracted bitstream identifier.

For example, the bitstream identifier extraction unit 1530 extracts the bitstream identifier from the bitstream in case where one or more of the quantized frequency coefficients of the quantized frequency coefficient string transferred from the decoding unit 1520 are not '0'. If the extracted bitstream identifier is '1', it means that the bitstream is the rectangularly encoded bitstream, and thus the bitstream identifier extraction unit 1530 controls the decoding unit 1520 to output the quantized frequency coefficient string that is obtained by decoding the bitstream to the rectangular reconstruction unit 1540, while if the extracted bitstream identifier is '0', which means that the bitstream is the squarely encoded bitstream, the bitstream identifier extraction unit 1530 controls the decoding unit 1520 to output the quantized frequency coefficient string that is obtained by decoding the bitstream to the square reconstruction unit 1550. Also, if all of the quantized frequency coefficients of the quantized frequency coefficient string output from the decoding unit 1520 are '0', the bitstream identifier extraction unit 1530 controls the decoding unit 1520 to output the quantized frequency coefficient string to the square reconstruction unit 1550 without extracting the bitstream identifier from the bitstream.

The rectangular reconstruction unit 1540 reconstructs the quantized frequency coefficient string output from the successively decoding unit 1520 to the current block of the video according to the prediction mode in units of a rectangular block. That is, if the quantized frequency coefficients extracted through decoding of the bitstream are fed, the rectangular reconstruction unit 1540 generates the quantized residual block by performing an inverse scanning, divides the quantized residual block in units of a rectangular block, and performs inverse quantization and inverse transform of the plurality of quantized rectangular residual blocks. Then, the rectangular reconstruction unit 1540 generates a plurality of rectangularly predicted blocks by predicting successively the plurality of rectangular current blocks corresponding to the plurality of inversely transformed rectangular residual blocks, reconstructs the plurality of rectangular current blocks by adding the plurality of inversely transformed rectangular residual blocks to the plurality of rectangularly predicted blocks, and combines the respective current blocks to reconstruct the current block of the video.

The square reconstruction unit 1550 reconstructs and produces the current block according to the prediction mode in units of a square block using the quantized frequency coefficient string output from the decoding unit 1520.

Figure 16:
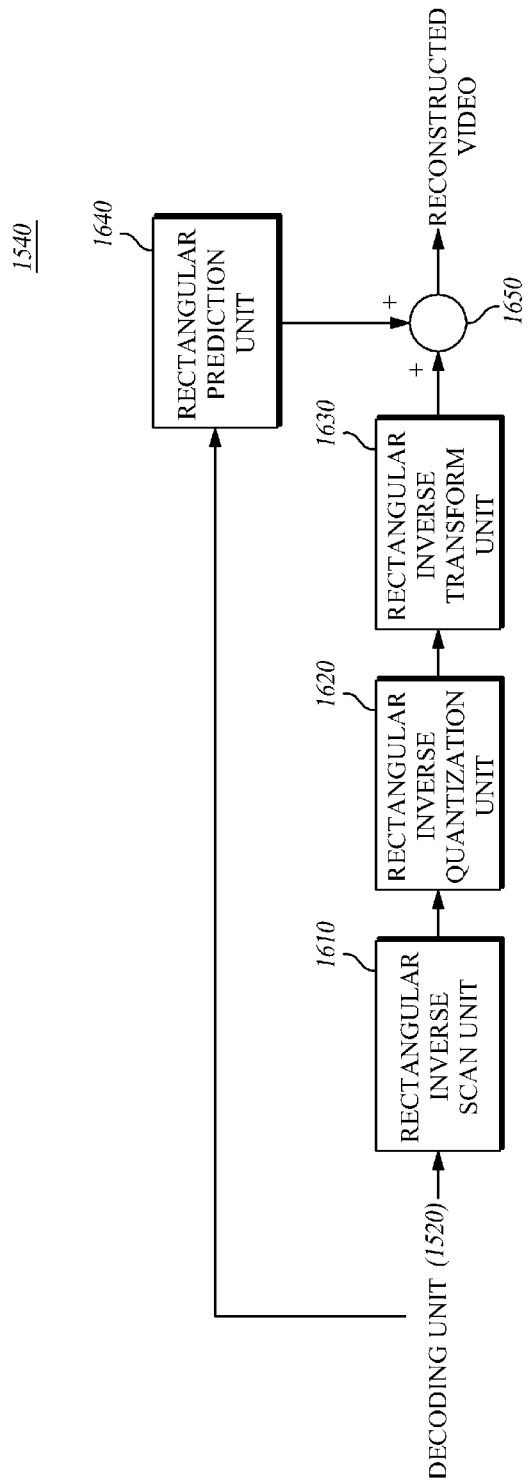
FIG. 16 is a block diagram schematically illustrating the electronic configuration of a rectangularly decoding device according to an aspect.

FIG. 16 is a block diagram schematically illustrating the electronic configuration of a rectangularly decoding device according to an aspect of the present disclosure.

The rectangularly decoding device according to an aspect of the present disclosure may be implemented by the rectangular reconstruction unit 1540 in FIG. 15. Hereinafter, the rectangularly decoding device according to an aspect of the present disclosure will be called the rectangular reconstruction unit 1540.

The rectangular reconstruction unit 1540 according to an aspect of the present disclosure includes a rectangular inverse scan unit 1610, a rectangular inverse quantization unit 1620, a rectangular inverse transform unit 1630, a rectangular prediction unit 1640, and a rectangular addition unit 1650.

The rectangular inverse scan unit 1610, upon receiving the quantized frequency coefficients extracted through decoding of the bitstream, generates quantized residual block by performing inverse scanning of the quantized frequency coefficients, divides the quantized residual block in units of a rectangular block, and produces a plurality of quantized rectangular residual blocks.

Here, the rectangular inverse scan unit 1610 determines an initial inverse scanning pattern in accordance with the size of the video, and scans the quantized frequency coefficients. For example, if the size of the video is equal to or larger than a preset size, the initial inverse scanning pattern can be determined by assigning priorities to the coefficients of the DC component among the quantized frequency coefficients of the quantized residual block and the lowermost coefficients of the square residual block, and further by assigning a higher priority to the coefficients of the DC component. Also, if the size of the video is smaller than the preset size, the initial inverse scanning pattern can be determined by assigning the same priority to the coefficients of the DC component among the quantized frequency coefficients of the quantized residual block and the lowermost coefficients of the square residual block.

Also, the rectangular inverse scan unit 1610 can adaptively update the inverse scanning pattern whenever the quantized frequency coefficients which are not '0' occur in each position of the quantized residual block. For example, the rectangular inverse scan unit 1610 can adaptively update the inverse scanning pattern by calculating the probability of the occurrence of non-zero quantized frequency coefficients in each position of the quantized residual block whenever the bitstream is decoded, and determining the scanning order in the order of high probability.

The rectangular inverse quantization unit 1640 performs inverse quantization of the plurality of quantized rectangular residual blocks. The rectangular inverse transform unit 1630 performs inverse transform of the plurality of inversely quantized rectangular residual blocks into a time domain.

The rectangular prediction unit 1640 generates a plurality of rectangularly predicted blocks by successively predicting the plurality of rectangular current blocks corresponding to the plurality of inversely transformed rectangular residual blocks. Here, the rectangular prediction unit 1640 successively predicts the plurality of rectangular current blocks along the prediction direction by the prediction mode extracted from the bitstream.

The rectangular addition unit 1650 reconstructs the plurality of rectangular current blocks by adding the plurality of inversely transformed rectangular residual blocks to the plurality of rectangularly predicted blocks to reconstruct the video, and produces the reconstructed video.

The rectangular reconstruction unit 1540 as described above, upon receiving the quantized frequency coefficients extracted through decoding of the bitstream, generates a quantized residual block through the inverse scanning, divides the quantized residual block in units of a rectangular block, and produces a plurality of quantized rectangular residual blocks. Then, the rectangular reconstruction unit 1540 performs inverse quantization of the plurality of quantized rectangular residual blocks, and performs inverse transform of the plurality of inversely quantized rectangular residual blocks. Then, the rectangular reconstruction unit 1540 generates a plurality rectangularly predicted blocks by successively predicting the plurality of rectangular current blocks corresponding to the plurality of inversely transformed rectangular residual blocks, reconstructs the plurality of rectangular current blocks by adding the plurality of inversely transformed rectangular residual blocks to the plurality of rectangularly predicted blocks, and combines the respective current blocks to reconstruct the current block of the video.

Figure 17:
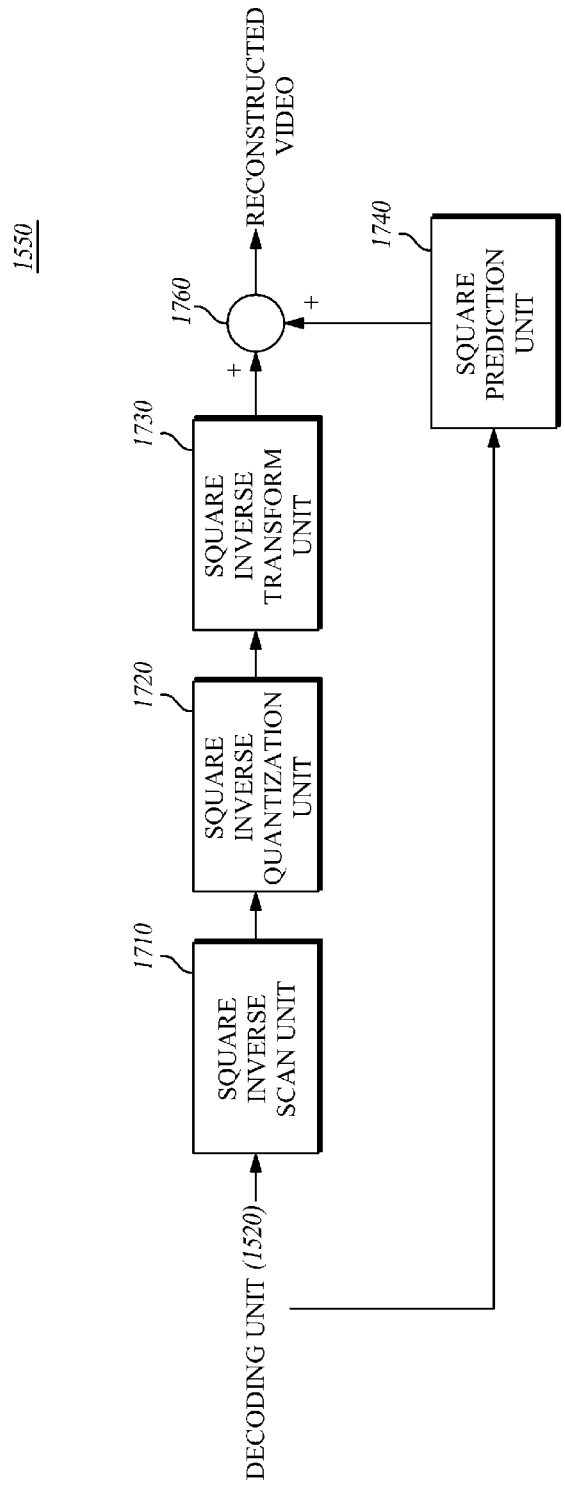
FIG. 17 is a block diagram schematically illustrating the electronic configuration of a squarely encoding device according to an aspect.

FIG. 17 is a block diagram schematically illustrating the electronic configuration of a squarely decoding device according to an aspect of the present disclosure.

The squarely decoding device according to an aspect of the present disclosure may be implemented by the square reconstruction unit 1550. Hereinafter, the squarely decoding device according to an aspect of the present disclosure will be called the square reconstruction unit 1550.

The square reconstruction unit 1550 according to an aspect of the present disclosure includes a square inverse scan unit 1710, a square inverse quantization unit 1720, a square inverse transform unit 1730, a square prediction unit 1740, and a square addition unit 1750.

The square inverse scan unit 1710 generates a quantized square residual block by performing inverse scanning of the quantized frequency coefficient string output from the decoding unit 1520.

The square inverse quantization unit 1720 performs inverse quantization of the quantized square residual blocks. The square inverse transform unit 1730 performs inverse transform of the inversely quantized square residual blocks into a time domain.

The square prediction unit 1740 generates squarely predicted blocks by predicting the square current blocks corresponding to the inversely transformed square residual blocks. Here, the square prediction unit 1740 predicts the square current blocks according to the prediction direction by the prediction mode extracted from the bitstream.

The square addition unit 1750 reconstructs the square current blocks by adding the inversely transformed square residual blocks to the squarely predicted blocks to reconstruct the video, and outputs the reconstructed video.

Figure 18:
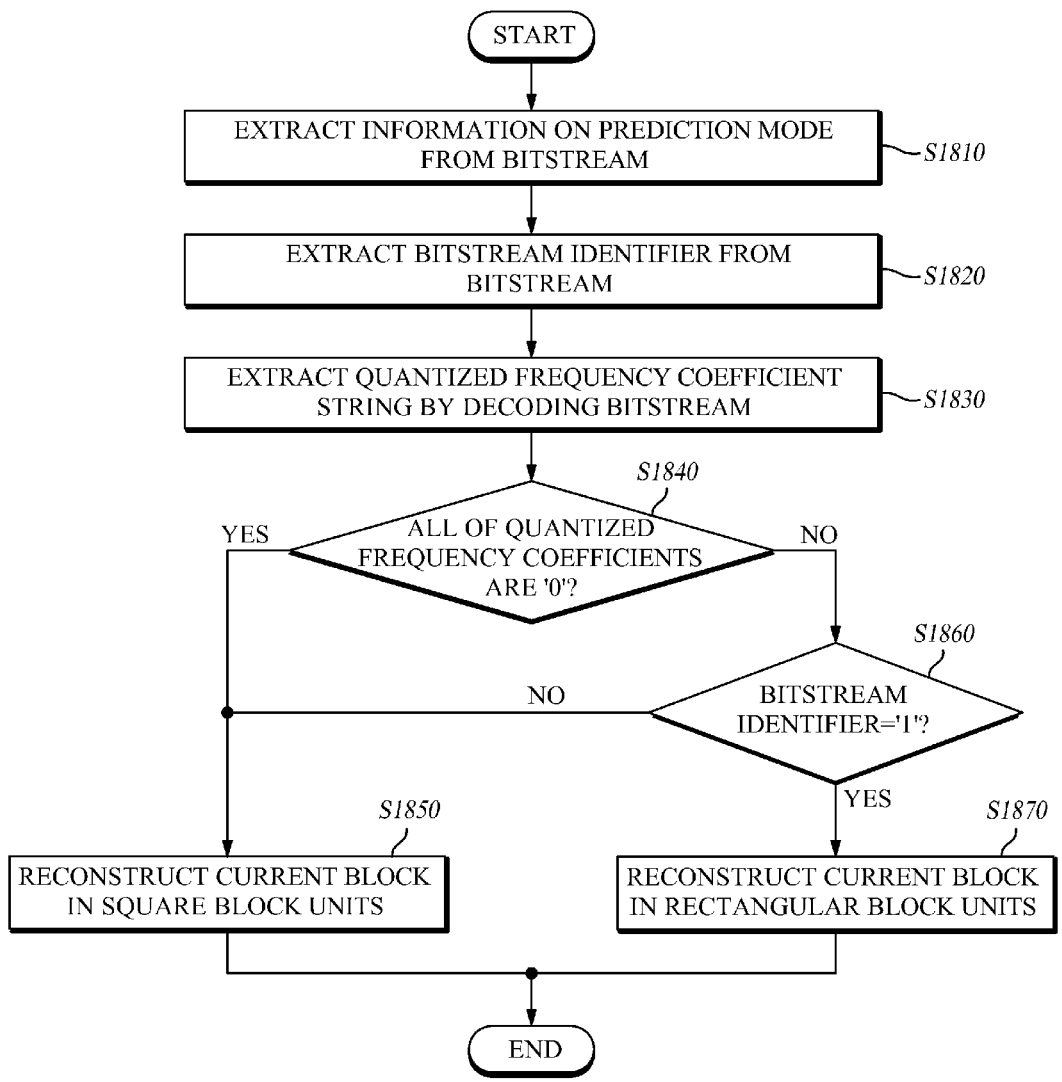
FIG. 18 is a flowchart illustrating a video decoding method according to an aspect.

FIG. 18 is a flowchart illustrating a video decoding method according to an aspect of the present disclosure.

The video decoding apparatus 1500, which has received and stored the bitstream of the video through a wired/wireless communication network or a cable, reconstructs the video by decoding the video to reproduce the video according to a user's selection or by a program currently running.

To this end, the video decoding apparatus 1500 extracts information on the prediction mode from the bitstream (step S1810), and extracts the quantized frequency coefficient string by decoding the bitstream (step S1820). The video decoding apparatus 1500, which has extracted the quantized frequency coefficient string (step S1830), checks whether all of the quantized frequency coefficients of the quantized frequency coefficient string are '0' (step S1840). If all of the quantized frequency coefficients of the quantized frequency coefficient string are '0' as a result of check at step S1840, the video decoding apparatus 1500 reconstructs and outputs the current block in accordance with the prediction mode in units of a square block using the quantized frequency coefficient string (step S1850), while if all of the quantized frequency coefficients of the quantized frequency coefficient string are not '0' as a result of check at step S1830, the video decoding apparatus 1500 extracts the bitstream identifier and checks whether the bitstream identifier is '1' (step S1860). If the bitstream identifier is '1', the video decoding apparatus identifies that the corresponding bitstream is a rectangular bitstream, and reconstructs and successively outputs the current block of the video in accordance with the prediction mode in units of a square block using the quantized frequency coefficient string (step S1870). Also, if the bitstream identifier is not '1', the video decoding apparatus identifies that the corresponding bitstream is a square bitstream, and reconstructs and outputs the current block of the video in accordance with the prediction mode in units of a square block using the quantized frequency coefficient string.

Figure 19:
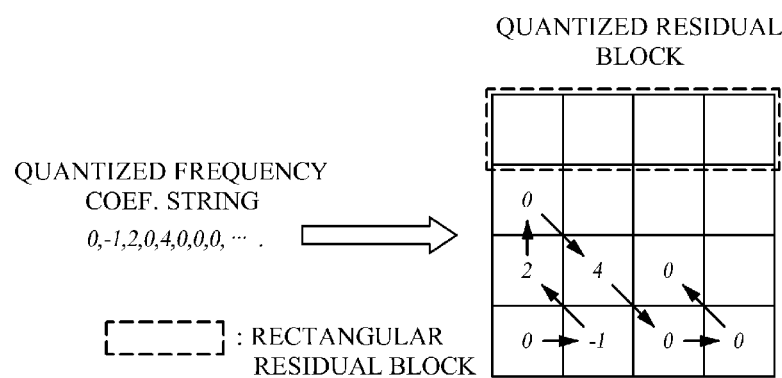
FIG. 19 is an exemplary diagram illustrating an inverse scanning process in an initial inverse scanning pattern according to an aspect.

FIG. 19 is an exemplary diagram illustrating an inverse scanning process according to an initial inverse scanning pattern according to an aspect of the present disclosure.

The video decoding apparatus 1500 determines the initial inverse scanning pattern in accordance with the size of the video, and configures the quantized residual block by performing the inverse scanning of the quantized frequency coefficient string according to the initial inverse scanning pattern. In FIG. 19, under the assumption that the quantized frequency coefficient string is "0, −1, 2, 0, 4, 0, 0, 0, . . . ", the size of the video is CIF, the block mode has a size of 4×4, and the prediction mode is a vertical mode, a process of configuring the quantized residual block through inverse scanning according to the determined initial scanning pattern is illustrated.

The determination of the initial inverse scanning pattern according to the size of the video is similar to that of the initial scanning pattern as described above with reference to FIG. 13. That is, the probability of the occurrence of non-zero values in the quantized frequency coefficients of the square residual block varies according to the size of the video, and if the size of the video becomes larger, the probability of the occurrence of non-zero values in the coefficients of the DC component becomes higher than the probability of the occurrence of non-zero values in the coefficients in the lowermost portion. The initial scanning pattern is determined according to the size of the video using the above-described characteristics.

For example, if the size of the video is equal to or larger than a preset size, given that a threshold size to be compared with the size of the video is preset, the initial inverse scanning pattern can be determined in such a manner as arranging the read quantized frequency coefficients by assigning priorities to the positions corresponding to the coefficients of the DC component among the positions of the quantized frequency coefficients of the quantized residual block which are received in order from the quantization frequency coefficient string, and the positions corresponding to the lowermost coefficients of the square residual block, and further by assigning a higher priority to the positions of the coefficients of the DC component. Also, if the size of the video is smaller than the preset size, the initial reverse scanning pattern can be determined by assigning the same priority to the positions corresponding to the coefficients of the DC component among the positions corresponding to the quantized frequency coefficients of the quantized residual block and the positions corresponding to the lowermost coefficients of the square residual block.

In an example of FIG. 19, in case where the preset size is 720p and the size of the video is CIF, the size of the video is smaller than the preset size, and thus the quantized residual block as illustrated can be obtained by performing inverse scanning by assigning the same priority to the positions corresponding to the coefficients of the DC component and the positions corresponding to the lowermost coefficients.

Also, if the residual block that is quantized through the inverse scanning is configured, the quantized residual block is divided into a plurality of residual blocks along the vertical direction that is the prediction direction of the prediction mode of the current block to provide the plurality of rectangular residual blocks.

Figure 20:
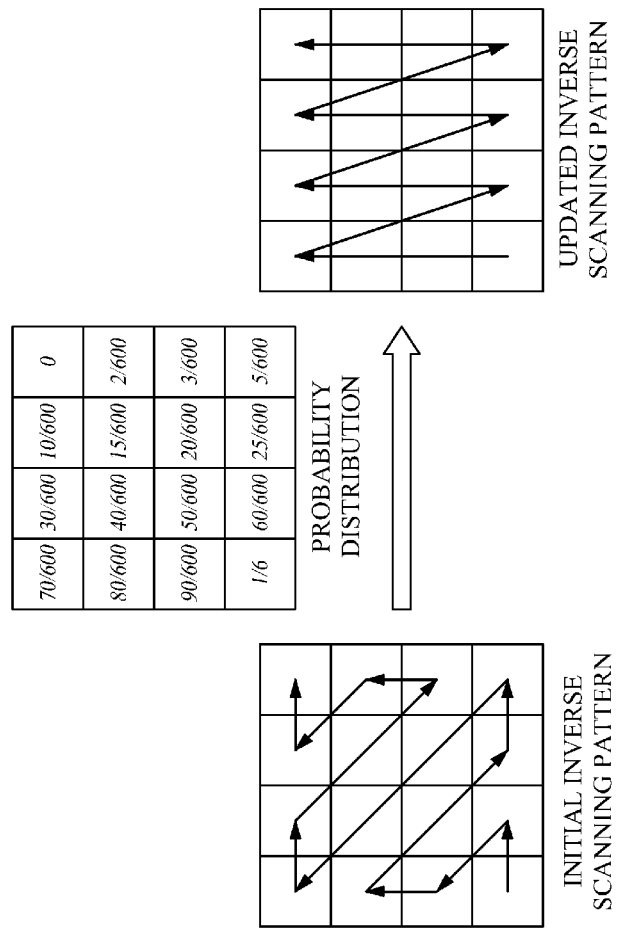
FIG. 20 is an exemplary diagram illustrating a process of updating an inverse scanning pattern according to an aspect.

FIG. 20 is an exemplary diagram illustrating a process of updating an inverse scanning pattern according to an aspect of the present disclosure.

Like the updating of the scanning pattern in the video encoding apparatus 200, the video decoding apparatus 1500 can also update the inverse scanning pattern. That is, whenever the block is decoded, the inverse scanning is not performed using the initial inverse scanning pattern initially determined, but is performed by adaptively updating the inverse scanning pattern.

At this time, the reference of updating the inverse scanning pattern is similar to the reference of updating the scanning pattern. That is, the reference of updating the inverse scanning pattern may be the probability of the occurrence of non-zero quantized frequency coefficients in each position of the quantized residual block. For example, the inverse scanning pattern can be adaptively updated by calculating the probability of the occurrence of non-zero quantized frequency coefficients in the respective positions of the quantized residual block whenever the plurality of blocks of the video is decoded, and determining the inverse scanning order in the order of high probability.

Figure 21:
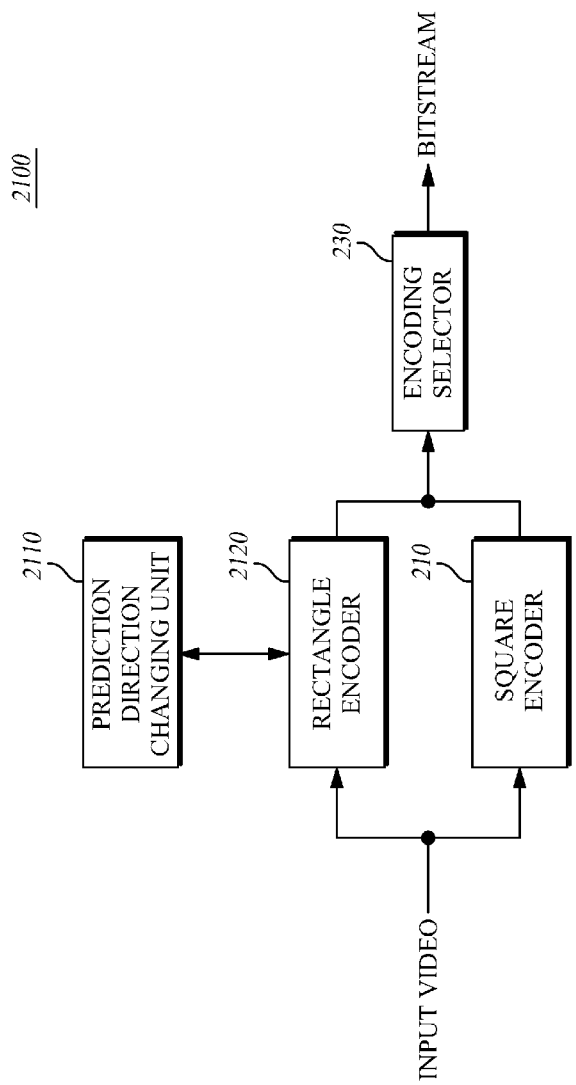
FIG. 21 is a block diagram schematically illustrating the electronic configuration of a video encoding apparatus according to another aspect.

FIG. 21 is a block diagram schematically illustrating the electronic configuration of a video encoding apparatus according to another aspect of the present disclosure.

A video encoding apparatus 2100 according to another aspect of the present disclosure may include a square encoder 210, an encoding selector 230, a prediction direction changing unit 2110, and a rectangle encoder 2120.

The video encoding apparatus 2100 may be a personal computer or PC, notebook or laptop computer, personal assistant or PDA, portable multimedia player or PMP, PlayStation Portable or PSP, or mobile communication terminal, and may mean a variety of apparatuses equipped with, for example, a communication system such as a modem for carrying out communications between various devices or wired/wireless communication networks, a memory for storing various programs for encoding videos and related data, and a microprocessor for executing the programs to effect operations and controls thereof.

Since the square encoder 210 and the encoding selector 230 perform the same or similar roles as described above with reference to FIG. 2, the detailed description thereof will be omitted.

The prediction direction changing unit 2110 converts or changes the prediction direction of the respective rectangular current blocks according to the coefficient values of the quantized frequency coefficients of the rectangular previous blocks encoded prior to the rectangular current blocks which are successively encoded by the rectangle encoder 2120.

To this end, the prediction direction changing unit 2110 is connected to the rectangle encoder 2120, and receives and stores the quantized frequency coefficients of the rectangular previous blocks encoded prior to the rectangular current blocks from the rectangle encoder 2120.

The rectangle encoder 2120, upon receiving the current blocks, successively encodes the plurality of rectangular current blocks divided and generated in units of a rectangular block, and generates the rectangularly encoded bitstream. In this case, the rectangle encoder 2120 can predict the plurality of rectangular current blocks according to the prediction direction changed by the prediction direction changing unit 2110.

The rectangle encoder 2120 has the same structure as that of the rectangle encoder 220 as described above with reference to FIG. 4. However, the rectangle encoder 460 and the rectangular prediction unit 492 are connected to the prediction direction changing unit 2110, the rectangle encoder 460 transfers the quantized frequency coefficients of the respective rectangular current blocks transferred from the rectangular scan unit 450 to the prediction direction changing unit 2110, and the rectangular prediction unit 492 predicts the respective rectangular current blocks according to the prediction direction transferred from the prediction direction changing unit 2110. Here, the prediction direction that the rectangular prediction unit 492 receives from the prediction direction changing unit 2110 may be a prediction direction of the prediction mode of the current blocks, or may be a prediction direction changed according to the quantized frequency coefficients of the rectangular previous blocks.

Figure 22:
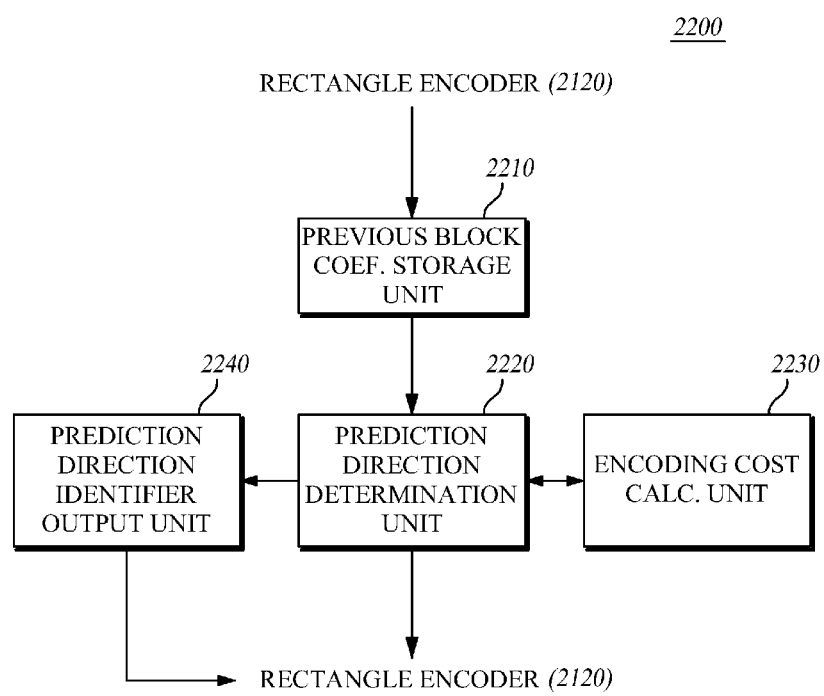
FIG. 22 is a block diagram schematically illustrating the electronic configuration of a prediction direction changer according to another aspect.

FIG. 22 is a block diagram schematically illustrating the electronic configuration of a prediction direction changing device according to another aspect of the present disclosure.

The prediction direction changing device according to another aspect of the present disclosure may be implemented by the prediction direction changing unit 2110 in FIG. 21. Hereinafter, the prediction direction changing device according to another aspect of the present disclosure will be called the prediction direction changing unit 2110.

The prediction direction changing unit 2110 according to another aspect of the present disclosure includes a previous block coefficient storage unit 2210, a prediction direction determination unit 2220, an encoding cost calculation unit 2230, and a prediction direction identifier output unit 2240.

The previous block coefficient storage unit 2210 stores the quantized frequency coefficients of the rectangular previous blocks. That is, the previous block coefficient storage unit 2210 receives and stores the quantized frequency coefficient of the rectangular current block whenever the rectangularly encoding unit 2120 encodes the rectangular current block, and this quantized frequency coefficient becomes the quantized frequency coefficient of the rectangular previous block that is the criteria for determining the prediction direction for predicting the next rectangular current block.

The prediction direction determination unit 2220 changes the prediction direction for the respective rectangular current blocks when the current block is divided in units of a rectangular block and the plurality of rectangular current blocks is successively encoded. The prediction direction determination unit 2220 determines the prediction direction of the respective rectangular current blocks in case where all of the coefficient values of the quantized frequency coefficients of the rectangular previous blocks are '0' by checking the coefficient values of the quantized frequency coefficients of the rectangular previous blocks stored in the previous block coefficient storage unit 2210. Also, the prediction direction determination unit 2220 determines the prediction direction that corresponds to the minimum encoding cost (or the maximum encoding efficiency) among the plurality of prediction direction candidates as the prediction direction of the respective current blocks in case where at least one of the coefficient values of the quantized frequency coefficients of the rectangular previous blocks is not '0'.

That is, if all of the coefficient values of the quantized frequency coefficients of the rectangular previous blocks encoded prior to the encoding of the rectangular current blocks to be currently predicted are '0', this means that the prediction performance is excellent and thus the encoding efficiency is very high. In this case, the reference prediction direction of the rectangular previous blocks is determined as the prediction direction of the rectangular current blocks. Here, the reference prediction direction is the prediction direction of the current blocks divided from the current block or the prediction direction of the rectangular previous blocks.

Also, if at least one of the coefficient values of the quantized frequency coefficients of the rectangular previous blocks encoded prior to the encoding of the rectangular current blocks to be currently predicted is not '0', this means that the prediction accuracy is poor and thus the encoding efficiency is not very high. In this case, the prediction direction that corresponds to the minimum encoding cost among the plurality of prediction direction candidates is determined as the prediction direction of the rectangular current blocks in order to change the prediction direction without using the reference prediction direction as it is. Here, the prediction direction candidate group includes a plurality of prediction directions to be determined as the prediction direction of the rectangular current blocks, except for the reference prediction direction. The prediction direction candidate group, in case of an intra 4×4 prediction, may be 8 prediction directions except for the reference prediction direction among 9 prediction directions in total. However, if the number of prediction directions is increased, the calculation for the prediction direction may be complicated and degrade the encoding efficiency, and thus the number of prediction directions may be limited to a smaller number. For example, both side prediction directions around the reference prediction direction may be selected as the prediction direction candidate group.

The encoding cost calculation unit 2230 calculates the encoding cost according to the respective prediction direction of the plurality of prediction direction candidates. Here, the encoding cost may be a rate-distortion cost (RD cost), but is not limited thereto. That is, the encoding cost is not limited to the encoding cost, but may be a cost for measuring the encoding efficiency. Also, the encoding cost according to the prediction direction means a cost required when the encoding is performed in the corresponding prediction direction.

The prediction direction identifier output unit 2240 outputs the prediction direction identifier for identifying the prediction direction of the respective rectangular current block.

Figure 23:
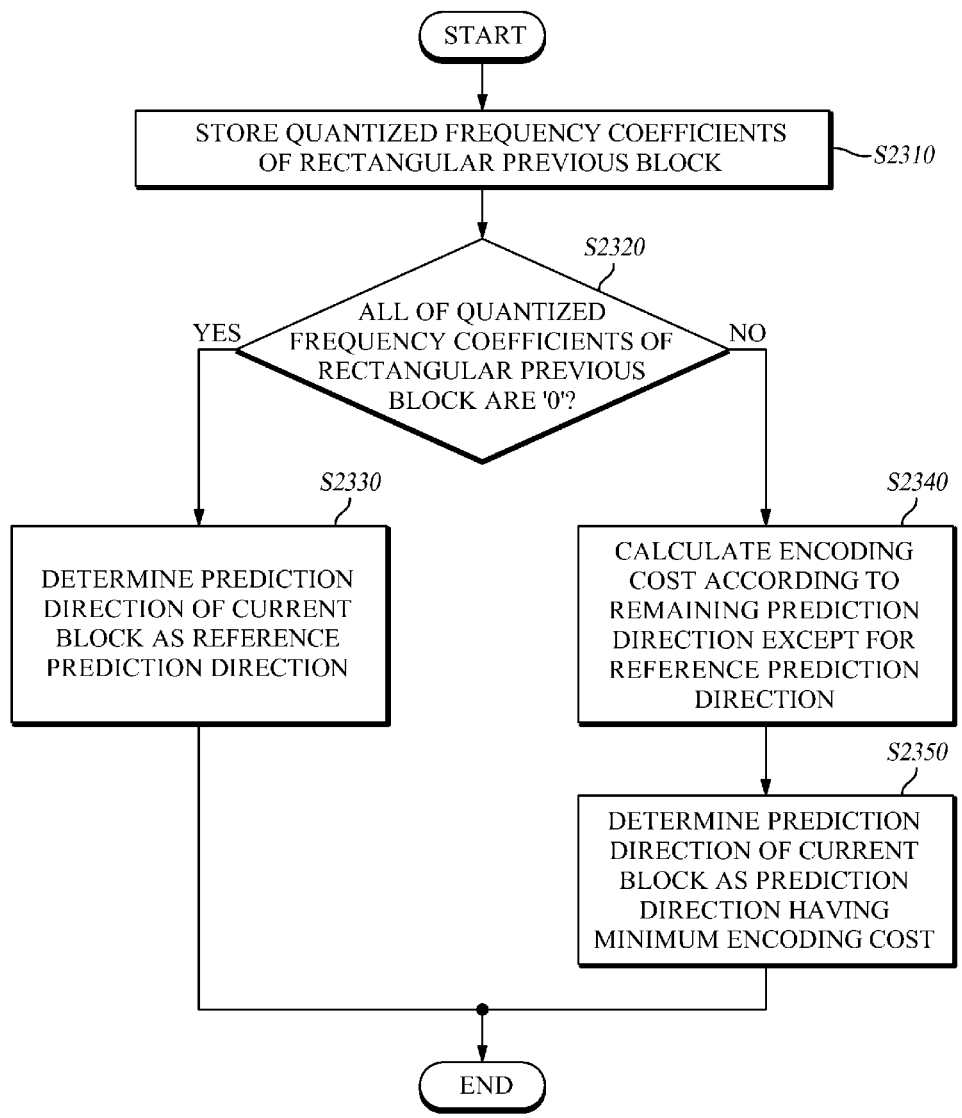
FIG. 23 is a flowchart illustrating a method of changing a prediction direction according to an aspect.

FIG. 23 is a flowchart illustrating a method of changing a prediction direction according to an aspect of the present disclosure.

When the prediction direction of the rectangular current block is determined, given that the quantized frequency coefficients of the rectangular previous blocks transferred from the rectangularly encoding unit 2120 are stored (step S2310), the prediction direction changing unit 2110 checks the quantized frequency coefficient of the rectangular previous blocks, and if all of the quantized frequency coefficients are '0', determines the prediction direction of the current block as the reference prediction direction (step S2330). If at least one of the quantized frequency coefficients is not '0', the prediction direction changing unit 2110 calculates the encoding cost according to the remaining prediction directions except for the reference prediction direction, i.e. according to the respective prediction directions of the prediction direction candidate group (step S2340), and determines the prediction direction having the minimum encoding cost as the prediction direction of the current blocks (step S2350) by comparing the respective encoding costs. That is, the prediction direction is changed from the reference prediction direction.

FIGS. 24 and 25 are exemplary diagrams illustrating a prediction direction candidate group according to another aspect of the present disclosure.

Referring to FIG. 24, if the prediction mode of the current block is the horizontal mode, the prediction direction of the current block is the horizontal direction, and the prediction direction candidates may be the diagonal up-right direction and the diagonal down-right direction, which are both side directions, around the center of the horizontal direction, which is the prediction direction of the current block.

In this case, if it is assumed that the reference prediction direction is a horizontal direction indicated by a dotted line, the horizontal direction which is the reference prediction direction becomes the prediction direction of the rectangular current block as it is in case where all of the quantized frequency coefficients of the rectangular previous blocks a, b, c, and d are '0'. However, if at least one of the quantized frequency coefficients of the rectangular previous blocks a, b, c, and d is not '0', the direction which corresponds to the minimum encoding cost between the diagonal up-right direction which is the side direction except for the horizontal direction and the diagonal down-right direction, which are the reference prediction directions, becomes the prediction direction of the rectangular current block.

Referring to FIG. 25, if the prediction mode of the current block is a diagonal down-right mode, the prediction direction of the current block becomes the diagonal down-right direction, and the prediction direction candidates become the horizontal direction and the vertical direction, which are the both side directions, around the diagonal down-right direction, that is the prediction direction of the current block.

In this case, if it is assumed that the reference prediction direction is the diagonal down-right direction indicated by a dotted line, the diagonal down-right direction which is the reference prediction direction becomes the prediction direction of the rectangular current block as it is in case where all of the quantized frequency coefficients of the rectangular previous blocks a, b, c, and d are '0'. However, if at least one of the quantized frequency coefficients of the rectangular previous blocks a, b, c, and d is not '0', the direction which corresponds to the minimum encoding cost between the horizontal direction and the vertical direction, which are side directions except for the diagonal down-right direction that is the reference prediction direction among the prediction direction candidates, becomes the prediction direction of the rectangular current block.

Figure 26:
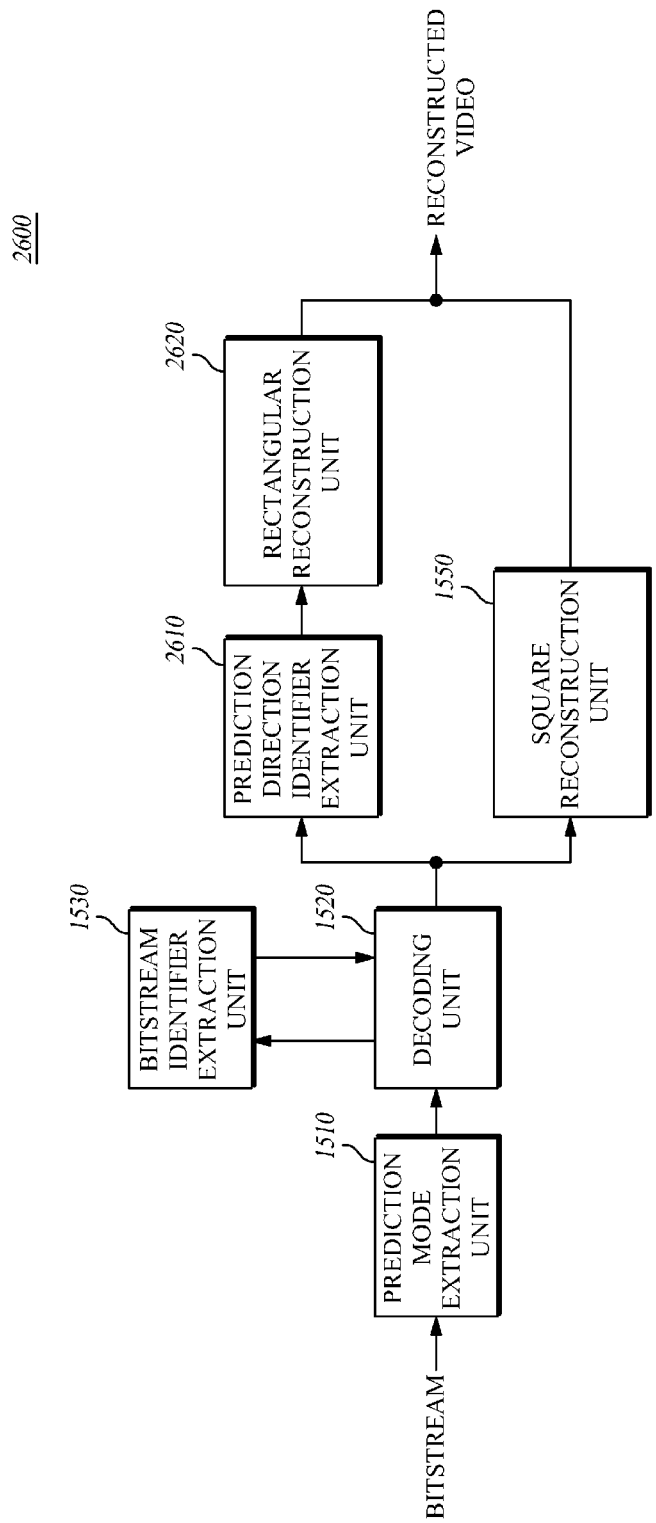
FIG. 26 is a block diagram schematically illustrating the electronic configuration of a video decoding apparatus according to another aspect.

FIG. 26 is a block diagram schematically illustrating an electronic configuration of a video decoding apparatus 2600 according to another aspect of the present disclosure.

The video decoding apparatus 2600 according to another aspect of the present disclosure includes a prediction mode extraction unit 1510, a decoding unit 1520, a bitstream identifier extraction unit 1530, a prediction direction identifier extraction unit 2610, a rectangular reconstruction unit 2620, and a square reconstruction unit 1550.

The video decoding apparatus 2600 may be a PC (Personal Computer), notebook or laptop computer, personal assistant or PDA, portable multimedia player or PMP, PlayStation Portable or PSP, or mobile communication terminal, and may mean a variety of apparatuses equipped with, for example, a communication system such as a modem for carrying out communications between various devices or wired/wireless communication networks, a memory for storing various programs for encoding videos and related data, and a microprocessor for executing the programs to effect operations and controls thereof.

Since the prediction mode extraction unit 1510, the decoding unit 1520, the bitstream identifier extraction unit 1530, and the square reconstruction unit 1550 performs the same or similar functions as described with reference to FIG. 15, the detailed description thereof will be omitted.

The prediction direction changing unit 2610 extracts the prediction direction identifier from the quantized frequency coefficient string transferred from the decoding unit 1520, and changes the prediction direction of the respective current blocks to the prediction direction indicated by the prediction direction identifier.

The rectangular reconstruction unit 2620 reconstructs and successively outputs the current blocks according to the prediction direction changed by the prediction direction changing unit 2610 in units of a rectangular block using the quantized frequency coefficient string. Here, the rectangular reconstruction unit 2620 has the same structure as that of the rectangular reconstruction unit 1540 as described above with reference to FIG. 16. However, in the rectangular reconstruction unit 2620, the rectangular prediction unit 1640 is connected to the prediction direction changing unit 2610, and the rectangular prediction unit 1640 predicts the rectangular current blocks according to the prediction direction transferred from the prediction direction changing unit 2610, which is not the prediction direction of the prediction mode of the current blocks.

The video decoding apparatus 2600 according to another aspect of the present disclosure, as a method of decoding the video, extracts information on the prediction mode from the bitstream, extracts the quantized frequency coefficient string by decoding the bitstream, changes the prediction direction according to the prediction mode by extracting the prediction direction identifier from the quantized frequency coefficient string, extracts the bitstream identifier from the bitstream, reconstructs the current block in units of a rectangle using the quantized frequency coefficient string according to the bitstream identifier, successively reconstructs the current blocks according to the changed prediction direction, reconstructs the bitstream identifier from the bitstream, reconstructs the current block in units of a square block using the quantized frequency coefficient string, and reconstructs and produces the current block according to the prediction direction according to the prediction mode.

Figure 27:
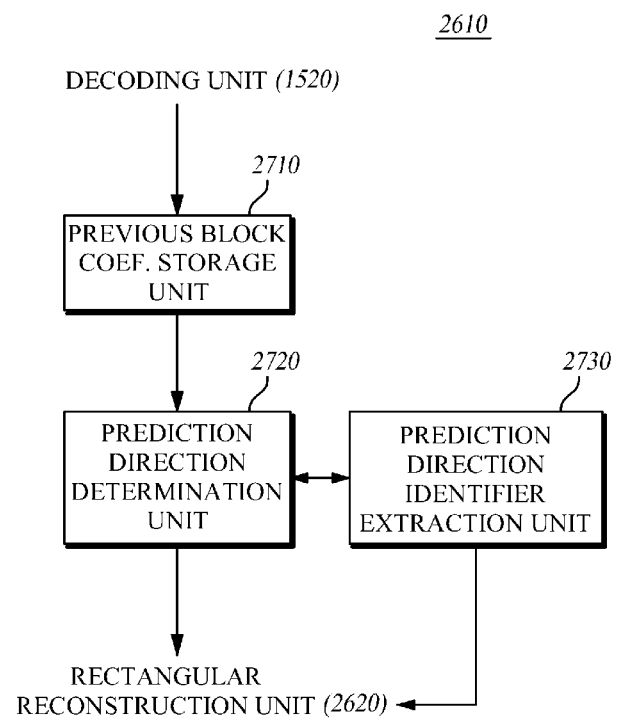
FIG. 27 is a block diagram schematically illustrating the electronic configuration of a prediction direction changer according to still another aspect.

FIG. 27 is a block diagram schematically illustrating the electronic configuration of a prediction direction changing device according to still another aspect of the present disclosure.

The prediction direction changing device according to still another aspect of the present disclosure may be implemented by the prediction direction changing unit 2610 in FIG. 26. Hereinafter, the prediction direction changing device according to still another aspect of the present disclosure will be called the prediction direction changing unit 2610.

The prediction direction changing unit 2610 according to still another aspect of the present disclosure includes a previous block coefficient storage unit 2710, a prediction direction determination unit 2720, and a prediction direction identifier extraction unit 2370.

The previous block coefficient storage unit 2710 stores the quantized frequency coefficients of the rectangular previous blocks decoded prior to the rectangular current blocks. That is, the previous block coefficient storage unit 2710 receives and stores the quantized frequency coefficients of the rectangular current blocks in the quantized frequency coefficient string transferred from the decoding unit 1520, and the stored quantization frequency coefficients become the quantized frequency coefficients of the rectangular previous blocks used when the next rectangular current block is encoded.

The prediction direction determination unit 2720 determines the reference prediction direction as the prediction direction of the respective rectangular current blocks in case where all of the coefficient values of the quantized frequency coefficients of the rectangular previous blocks stored in the previous block coefficient storage unit 2710 are '0', and determines the prediction direction indicated by the prediction direction identifier extracted from the quantized frequency coefficient string as the prediction direction of the respective rectangular current blocks in case where at least one of the coefficient values of the quantized frequency coefficients of the rectangular previous blocks is not '0'.

The prediction direction identifier extraction unit 2730 extracts the prediction direction identifier from the quantized frequency coefficient string transferred from the decoding unit under the control of the prediction direction determination unit 2720.

Here, the reference prediction direction may be one of the prediction direction of the current block and the prediction direction of the rectangular previous block, and the prediction direction candidates may be determined based on the reference prediction direction.

Figure 28:
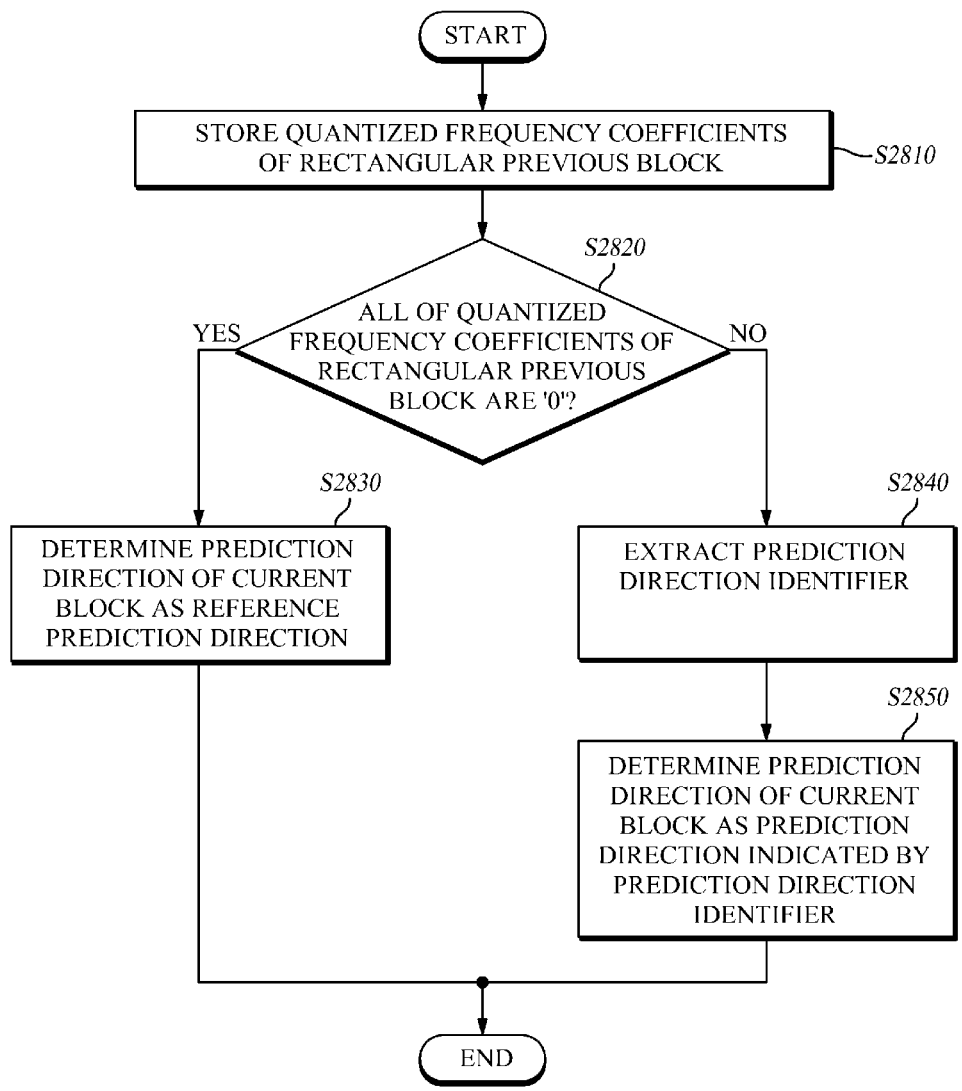
FIG. 28 is a flowchart illustrating a method of changing a prediction direction according to another aspect.

FIG. 28 is a flowchart illustrating a method of changing a prediction direction according to another aspect of the present disclosure.

The prediction direction changing device according to another aspect of the present disclosure, i.e. the prediction direction changing unit 2610 stores the quantized frequency coefficients of the rectangular previous blocks (step S2810), checks whether all of the quantized frequency coefficients of the rectangular previous blocks are '0' (step S2820), determines the reference prediction direction as the prediction direction of the rectangular previous blocks in case where all of the quantized frequency coefficients of the rectangular previous blocks are '0' (step S2830), extracts the prediction direction identifier from the quantized frequency coefficient string if at least one of the quantized frequency coefficients of the rectangular previous blocks is not '0' (step S2840), and determines the prediction direction indicated by the prediction direction identifier as the prediction direction of the rectangular current block (step S2850).

FIGS. 29 and 30 are exemplary diagrams illustrating a prediction direction candidate group according to still another aspect of the present disclosure.

The reference prediction direction is determined as the prediction direction of the rectangular current block according to the coefficient values of the quantized frequency coefficients of the rectangular previous block, or one of both side prediction directions around the prediction direction of the prediction mode of the current block indicated by the prediction direction identifier is determined as the prediction direction of the rectangular current block.

Through the above-described aspects, the following aspects may be adopted. That is, in case of predicting, transforming, and quantizing in units of a square block, the prediction is not performed according to the prediction direction of the prediction mode of the corresponding block whenever the square blocks are predicted, but is performed by checking the quantized frequency coefficients of the previous square blocks and changing the prediction direction according to the coefficient values of the quantized frequency coefficients, thereby improving the prediction accuracy and the encoding efficiency.

Accordingly, the prediction direction changing device according to still anther aspect of the present disclosure, when predicting the current block of the video for the video encoding, stores the input quantized frequency coefficients of the previous block encoded prior to the current block, if all of the quantized frequency coefficients of the previous block are '0' when the quantized frequency coefficients of the current block are received, determines the reference prediction direction as the prediction direction of the current block, if at least one of the quantized frequency coefficients of the previous block is not '0', calculates the encoding costs of the plurality of prediction direction candidates and determines the prediction direction that corresponds to the minimum encoding cost as the prediction direction of the current block. Also, the prediction direction changing device outputs the prediction direction identifier for identifying the prediction direction of the current block.

Also, the prediction direction changing device according to still anther aspect of the present disclosure, when predicting the current block of the video for the video decoding, stores the input quantized frequency coefficients of the previous block decoded prior to the current block, if all of the quantized frequency coefficients of the previous block are '0' when the quantized frequency coefficients of the current block are input, determines the reference prediction direction as the prediction direction of the current block, if at least one of the quantized frequency coefficients of the previous block is not '0', extracts the prediction direction identifier from the quantized frequency coefficients of the current block, and determines the prediction direction indicated by the prediction direction identifier as the prediction direction of the current block.

Here, the reference prediction direction may be one of the prediction direction of the current block and the prediction direction of the previous block, and the prediction direction candidates may be determined based on the reference prediction direction.

In the description above, although all of the components of the aspects of the present disclosure may have been explained as assembled or operatively connected as a unit, the present disclosure is not intended to limit itself to such aspects. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

Also, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

[Industrial Applicability]

As described above, the present disclosure is highly useful for application in a video encoding or decoding apparatus to intra predict the pixels of the block to currently encode or decode with an improved prediction accuracy to increase the video coding efficiency.

The invention claimed is:

1. An apparatus for encoding a current block using an intra prediction, the apparatus comprising:
a rectangle encoder, upon receiving the current block, configured to sequentially encode the current block by dividing the current block into rectangular block units and produce a rectangularly encoded bitstream;
a square encoder configured to encode the current block in one or more square block units and produce a squarely encoded bitstream; and
an encoding selector configured to select one of the rectangle encoder and the square encoder,
wherein the rectangle encoder comprises:
a block divider configured to divide the current block into the rectangular block units and produce a plurality of rectangular subblocks;
a rectangular prediction unit configured to predict the plurality of rectangular subblocks sequentially and output a plurality of rectangularly predicted subblocks;
a rectangular subtraction unit configured to subtract the plurality of rectangularly predicted subblocks from the plurality of rectangular subblocks and generate a plurality of rectangular residual subblocks;
a rectangular transform unit configured to transform the plurality of rectangular residual subblocks into a frequency domain;
a rectangular quantization unit configured to quantize the plurality of transformed rectangular residual subblocks;
a scan unit configured to scan quantized frequency coefficients of the plurality of quantized rectangular residual subblocks; and
an encoder configured to encode the scanned quantized frequency coefficients and generate the rectangularly encoded bitstream.

2. The apparatus of claim 1, wherein the encoding selector comprises:
a bitstream selector configured to calculate encoding cost of the rectangularly encoded bitstream and the squarely encoded bitstream, and configured to select the bitstream having the minimum encoding cost; and
a bitstream identifier generator configured to generate a bitstream identifier for identifying the selected bitstream.

3. The apparatus of claim 2, wherein the bitstream identifier generator is configured to output the bitstream identifier when at least one of quantized frequency coefficients of the selected bitstream is not '0'.

4. A method performed by an apparatus for encoding a current block using an intra prediction, the method comprising:
receiving the current block, rectangularly and sequentially encoding the current block after dividing the current block into rectangular block units, and generating a rectangularly encoded bitstream;
receiving the current block, squarely encoding the current block one or more square block units, and generating a squarely encoded bitstream; and
selecting one of the rectangularly encoded bitstream and the squarely encoded bitstream,
wherein the generation of the rectangularly encoded bitstream comprises:
dividing the current block into rectangular block units and producing a plurality of rectangular subblocks;
predicting the plurality of rectangular subblocks sequentially and outputting a plurality of rectangularly predicted subblocks;
subtracting the plurality of rectangularly predicted subblocks from the plurality of rectangular subblocks and generating a plurality of rectangular residual subblocks;
transforming the plurality of rectangular residual subblocks into a frequency domain;
quantizing the plurality of transformed rectangular residual subblocks;
scanning quantized frequency coefficients of the plurality of quantized residual subblock; and
encoding the scanned quantized frequency coefficients and generating the rectangularly encoded bitstream.

5. The method of claim 4, wherein the selecting the bitstream comprises:
comparing the encoding cost of the rectangularly encoded bitstream and the encoding cost of the squarely encoded bitstream;
outputting the rectangularly encoded bitstream when encoding cost is lower than that of the squarely encoded bitstream;
generating a bitstream identifier as a first value when at least one of quantized frequency coefficients of the rectangularly encoded bitstream is not '0' when the rectangularly encoded bitstream is output;
outputting the squarely encoded bitstream when the encoding cost of the rectangularly encoded bitstream is equal to or higher than the encoding cost of the squarely encoded bitstream; and
generating the bitstream identifier as a second value when at least one of the quantized frequency coefficients of the squarely encoded bitstream is not '0' when the squarely encoded bitstream is output.

6. The apparatus of claim 1, wherein the rectangle encoder further comprises:
a rectangular inverse quantization unit configured to inverse-quantize the plurality of quantized rectangular residual subblocks and generate a plurality of inverse-quantized rectangular residual subblocks;
a rectangular inverse transform unit configured to inverse-transform the plurality of inverse-quantized rectangular residual subblocks into a time domain and generate a plurality of inverse-transformed rectangular residual subblocks; and
an adder configured to sequentially reconstruct the plurality of rectangular subblocks by adding each of the plurality of inverse-transformed rectangular residual subblocks and the rectangularly predicted subblock corresponding thereto,
wherein the rectangular prediction unit predicts subsequent rectangular subblocks by using one or more previously reconstructed rectangular subblocks.

7. The apparatus of claim 6, wherein the rectangular prediction unit is configured to predict the plurality of rectangular subblocks sequentially according to the prediction direction of the current blocks.

8. The apparatus of claim 1, wherein the scan unit is configured to generate a quantized square residual block by combining the plurality of quantized rectangular residual subblocks, and scan quantized frequency coefficients of the square residual block,
wherein the scan unit determines an initial scanning pattern according to a size of the video for scanning the quantized frequency coefficients of the square residual block.

9. The apparatus of claim 8, wherein the scan unit, when the size of the video is equal to or larger than a preset size, is configured to determine the initial scanning pattern by assigning priorities to the coefficient of DC component and the lowermost coefficient of the square residual block among the quantized frequency coefficients of the square residual block, wherein a higher priority is assigned to the coefficients of DC component.

10. The apparatus of claim 8, wherein the scan unit, when the size of the video is smaller than the preset size, is configured to determine the initial scanning pattern by assigning the same priority to the coefficient of the DC component and the lowermost coefficient of the square residual block among the quantized frequency coefficients of the square residual block.

11. The apparatus of claim 1, wherein the scan unit is configured to generate a quantized square residual block by combining the plurality of quantized rectangular residual subblocks, and scan quantized frequency coefficients of the square residual block,
wherein the scan unit adaptively updates the scanning pattern according to the probability of the occurrence of non-zero quantized frequency coefficients at respective positions in the square residual block.

12. The apparatus of claim 11, wherein the scan unit is configured to adaptively update the scanning pattern by calculating the probability of the occurrence of non-zero quantized frequency coefficients at the respective positions in the square residual block whenever the plurality of blocks of the video is encoded and by deciding a scanning sequence in the order of higher to lower degrees of the probability of the nonzero frequency coefficients.

13. An apparatus for decoding a current block using an intra prediction, comprising:
a prediction mode extractor configured to extract information on an intra prediction mode from a bitstream;
a decoder configured to decode the bitstream and extract quantized frequency coefficients;
a rectangular reconstruction unit configured to sequentially reconstruct a current block in rectangular block units according to the intra prediction mode by using the string of the quantized frequency coefficients;
a square reconstruction unit configured to sequentially reconstruct the current blocks in one or more square block units according to the intra prediction mode by using the string of the quantized frequency coefficients; and
a bitstream identifier extractor configured to identify a bitstream type indicating whether the bitstream is a rectangularly encoded bitstream or a squarely encoded bitstream, and control the decoder to output the quantized frequency coefficients to one of the rectangular reconstruction unit and the square reconstruction unit in accordance with the identified bitstream type,
wherein the rectangular reconstruction unit comprises:
an inverse scan unit configured to inverse scan the quantized frequency coefficients, and thereby produce a plurality of quantized rectangular residual subblocks corresponding to a plurality of rectangular subblocks of the current block;
a rectangular inverse quantization unit configured to perform inverse quantization of the plurality of quantized rectangular residual subblocks;
a rectangular inverse transform unit configured to perform inverse transform of the plurality of inversely quantized rectangular residual subblocks into a time domain;
a rectangular prediction unit configured to sequentially predict the plurality of rectangular subblocks, and generate a plurality of rectangularly predicted subblocks; and a rectangular addition unit configured to sequentially reconstruct the plurality of rectangular subblocks by adding each of the inversely transformed rectangular residual subblocks to a rectangularly predicted subblock corresponding thereto,
wherein the rectangular prediction unit predicts subsequent rectangular subblocks by using one or more previously reconstructed rectangular subblocks.

14. The apparatus of claim 13, wherein the bitstream identifier extractor is configured to control the decoder to output the quantized frequency coefficients to the square reconstruction unit when all of the quantized frequency coefficients are '0'.

15. A method of decoding a current block using an intra prediction, comprising:
extracting information on an intra prediction mode from a bitstream;
decoding the bitstream and extracting quantized frequency coefficients; and
identifieridentifying a bitstream type indicating whether the bitstream is a rectangularly encoded bitstream or a squarely encoded bitstream, and reconstructing the current block either sequentially in rectangular block units or in one or more square block units by using the intra prediction mode and the quantized frequency coefficients, according to the identified bitstream type,
wherein the reconstruction of the current block in the rectangular block units comprises:
inverse scanning the quantized frequency coefficients to thereby generate a plurality of quantized rectangular residual subblocks corresponding to a plurality of rectangular subblocks of the current block;
inverse quantizing the plurality of quantized rectangular residual subblocks;
inverse transforming the plurality of inverse quantized rectangular residual subblocks into a time domain;
sequentially predicting the plurality of rectangular subblocks, and generating a plurality of rectangularly predicted subblocks; and
sequentially reconstruct the plurality of rectangular subblocks by adding each of the plurality of inverse transformed rectangular residual subblocks to a rectangularly predicted subblock corresponding thereto,
wherein one or more previously reconstructed rectangular subblocks is used for predicting subsequent rectangular subblocks.

16. The method of claim 15, wherein the reconstructing reconstructs and outputs the current block in square block units by using the quantized frequency coefficients when all of the quantized frequency coefficients are '0' or a bitstream identifier extracted from the bitstream is '0'.

17. The method of claim 15, wherein the reconstructing reconstructs and outputs the current blocks sequentially in rectangular block units using the quantized frequency coefficients when at least one of the quantized frequency coefficients is not '0' and a bitstream identifier extracted from the bitstream is '1'.

18. The apparatus of claim 13, wherein the inverse scan unit is configured to inverse scan the quantized frequency coefficients to generate a quantized residual block, divide the quantized residual block in rectangular block units, and produce the plurality of quantized rectangular residual subblocks,
wherein the inverse scan unit determines an initial inverse scanning pattern for inverse scanning the quantized frequency coefficients, according to a size of the video.

19. The apparatus of claim 18, wherein when the size of the video is equal to or larger than a preset size, the inverse scan unit is configured to determine the initial inverse scanning pattern by assigning priorities to the coefficients of DC and the lowermost coefficient of the quantized residual block among the quantized frequency coefficients of the quantized residual block, wherein a higher priority is assigned a higher priority to the coefficient of DC component.

20. The apparatus of claim 18, wherein when the size of the video is smaller than the preset size, the inverse scan unit is configured to determine the initial inverse scanning pattern by assigning the same priority to the coefficients of DC component and the lowermost coefficient of the quantized residual block among the quantized frequency coefficients of the quantized residual block.

21. The apparatus of claim 13, wherein the inverse scan unit is configured to inverse scan the quantized frequency coefficients to generate a quantized residual block, divide the quantized residual block in rectangular block units, and produce the plurality of quantized rectangular residual subblocks,
wherein the inverse scan unit adaptively updates the inverse scanning pattern according to the probability of the occurrence of non-zero quantized frequency coefficients at each position in the quantized residual block.

22. The apparatus of claim 21, wherein the inverse scan unit is configured to adaptively update the inverse scanning pattern by calculating the probability of the occurrence of non-zero quantized frequency coefficients at each position in the quantized residual block whenever the bitstream is decoded and by deciding an inverse scanning sequence in the order of higher to lower degrees of the probability of the nonzero frequency coefficients.

23. The apparatus of claim 13, wherein the intra prediction mode extracted from the bitstream is an intra prediction mode of the current block,
wherein the rectangular prediction unit is configured to predict all of the plurality of rectangular subblocks sequentially according to the intra prediction mode of the current block.

24. The apparatus of claim 1,
wherein the rectangle encoder further comprises a prediction direction changer configured to change a prediction direction of a rectangular subblock to be currently encoded, according to quantized frequency coefficients of a previously encoded rectangular subblock.

25. The apparatus of claim 24, wherein the prediction direction changer comprises:
a previous block coefficient storage configured to store the quantized frequency coefficients of the previously encoded rectangular subblock;
a prediction direction determiner configured to determine a reference prediction direction as the prediction direction of the current rectangular subblock when all of the quantized frequency coefficients of the previously encoded rectangular subblocks are '0', and determine a prediction direction selected among a plurality of prediction direction candidates as the prediction direction of the current rectangular subblock when one or more the quantized frequency coefficients of the previously encoded rectangular subblocks are not '0'; and
a prediction direction identifier outputter configured to output a prediction direction identifier the prediction direction selected among the plurality of prediction direction candidates.

26. The apparatus of claim 25, wherein the reference prediction direction is one of the prediction direction of the current block and the prediction direction of the previously encoded rectangular subblock.

27. The apparatus as claimed claim 25, wherein the prediction direction candidates are determined based on the reference prediction direction.

28. The method of claim 4, wherein
a prediction direction of a rectangular subblock to be currently encoded is changed according to quantized frequency coefficients of a previously encoded rectangular subblock.

29. The method of claim 28, the changing of the prediction direction of the current rectangular subblock comprising:
storing the quantized frequency coefficients of the previously encoded rectangular block, when the prediction direction of the currently encoded rectangular block is changed according to quantized frequency coefficients of a previously encoded rectangular subblock;
determining a reference prediction direction as the prediction direction of the current rectangular subblock when all of the quantized frequency coefficients of the previously encoded rectangular subblock are '0';
determining a prediction direction selected among a plurality of prediction direction candidates as the prediction direction of the current rectangular subblock when one or more of the quantized frequency coefficients of the previously encoded rectangular subblock are not '0'; and
outputting a prediction direction identifier for identifying the prediction direction selected among the plurality of prediction direction candidates.

30. The method of claim 29, wherein the reference prediction direction is one of the prediction direction of the current block and the prediction direction of the previously encoded rectangular subblock.

31. The method as claimed in claim 30, wherein the prediction direction candidates are determined based on the reference prediction direction.

32. The apparatus of claim 13, wherein
the rectangular reconstruction unit comprises
a prediction direction changer configured to change a prediction direction of a rectangular subblock to be currently decoded, according to quantized frequency coefficients of a previously decoded rectangular subblock.

33. The apparatus of claim 32, wherein the prediction direction changer comprises:
a previous block coefficient storage configured to store the quantized frequency coefficients of the previously encoded rectangular subblock;
a prediction direction determiner configured to determine a reference prediction direction as the prediction direction of the current rectangular subblock when all of the quantized frequency coefficients of the previously decoded rectangular subblock are '0', and determine as the prediction direction of the current rectangular subblock, a prediction direction indicated by a prediction direction identifier among a plurality of prediction direction candidates when one or more of the quantized frequency coefficients of the previously decoded rectangular subblock are not '0'; and
a prediction direction identifier extractor configured to extract the prediction direction identifier of the current rectangular subblock.

34. The apparatus of claim 33, wherein the reference prediction direction is one of the prediction directions of the current blocks and the prediction direction of the previously decoded rectangular subblock.

35. The apparatus as claimed claim 33, wherein the prediction direction candidates are determined based on the reference prediction direction.

36. The method of claim 15, wherein
a prediction direction of a rectangular subblock to be currently decoded is changed, according to the quantized frequency coefficients of a previously encoded decoded rectangular subblock.

* * * * *